(12) United States Patent
Martin

(10) Patent No.: US 6,239,960 B1
(45) Date of Patent: May 29, 2001

(54) RECONFIGURABLE RECLOSING RELAY

(75) Inventor: Todd A. Martin, Troy, IL (US)

(73) Assignee: Basler Electric Company, Highland, IL (US)

( * ) Notice: Subject to any disclaimer, the term of this patent is extended or adjusted under 35 U.S.C. 154(b) by 0 days.

(21) Appl. No.: 09/055,001

(22) Filed: Apr. 3, 1998

(51) Int. Cl.⁷ ..................................................... H02H 3/00
(52) U.S. Cl. .............................. 361/86; 361/71; 361/115
(58) Field of Search ............................... 361/70, 71, 72, 361/93, 18, 115, 62, 64, 66, 86

(56) References Cited

U.S. PATENT DOCUMENTS

| | | | |
|---|---|---|---|
| Re. 28,490 | 7/1975 | Chen et al. ............................. | 317/23 |
| D. 354,945 | 1/1995 | Dellavecchia et al. ............. | D13/159 |
| 3,704,392 | 11/1972 | Chen et al. ............................. | 317/23 |
| 4,293,886 | 10/1981 | Church et al. ......................... | 361/71 |
| 4,454,556 | 6/1984 | DePuy ..................................... | 361/73 |
| 4,477,856 | 10/1984 | DePuy ..................................... | 361/72 |
| 4,484,246 | 11/1984 | Andow .................................... | 361/71 |
| 4,538,197 | 8/1985 | Breen ...................................... | 361/71 |
| 4,604,674 | 8/1986 | Hamel .................................... | 361/73 |
| 4,724,391 | 2/1988 | Blahous ................................. | 324/424 |
| 4,754,162 | 6/1988 | Kondou et al. ...................... | 307/112 |
| 4,757,416 | 7/1988 | Wilkerson ............................. | 361/84 |
| 4,845,594 | 7/1989 | Wilkerson ............................. | 361/71 |
| 4,899,247 | 2/1990 | Stewart ................................. | 361/72 |
| 4,994,934 | 2/1991 | Bouhenguel ......................... | 361/71 |
| 5,097,379 | 3/1992 | Walton et al. ........................ | 361/92 |
| 5,289,148 | 2/1994 | Siglock et al. ....................... | 335/202 |
| 5,384,678 | 1/1995 | Ebersohl et al. ....................... | 361/62 |
| 5,534,782 | 7/1996 | Nourse .................................. | 324/500 |
| 5,543,995 | 8/1996 | Kumagai et al. ...................... | 361/65 |

OTHER PUBLICATIONS

"Instructions Switchgear Reclosing Relay, Type ACR11A, GEH–1761", General Electric, pp. 4–19.
"Instructions Reclosing Relay, Types ACR11B, ACR11C, ACR11E, GEH–1786F", General Electric, pp. 2–17.

*Primary Examiner*—Stephen W Jackson
(74) *Attorney, Agent, or Firm*—Howell & Haferkamp, L.C.

(57) ABSTRACT

A reclosing relay is provided with switch settings and microprocessor control to permit emulation of a variety of different styles of motor-driven reclosing relays in power distribution systems. The reclosing relay is particularly suitable for replacement of General Electric Co. ACR11A, ACR11B and other similar model reclosing relays that are not electrically compatible with one another. Plug-and-play compatibility is provided by a chassis with electrical contacts that are both physically compatible with a variety of relay cases, and by switches that reconfigure the functions of the external terminals for compatibility with these types. The relay has a built-in microcomputer controller that is programmable through a serial port, and that provides for software emulation of the various required electrical functions of the reclosing relay. Because the GE ACR11A, GE ACR11B, and other similar types are no longer being made or supported by their manufacturer, the replacement relay allows a reduction in replacement part inventory. The relay is also well-suited for new applications.

25 Claims, 19 Drawing Sheets

Microfiche Appendix Included
(2 Microfiche, 125 Pages)

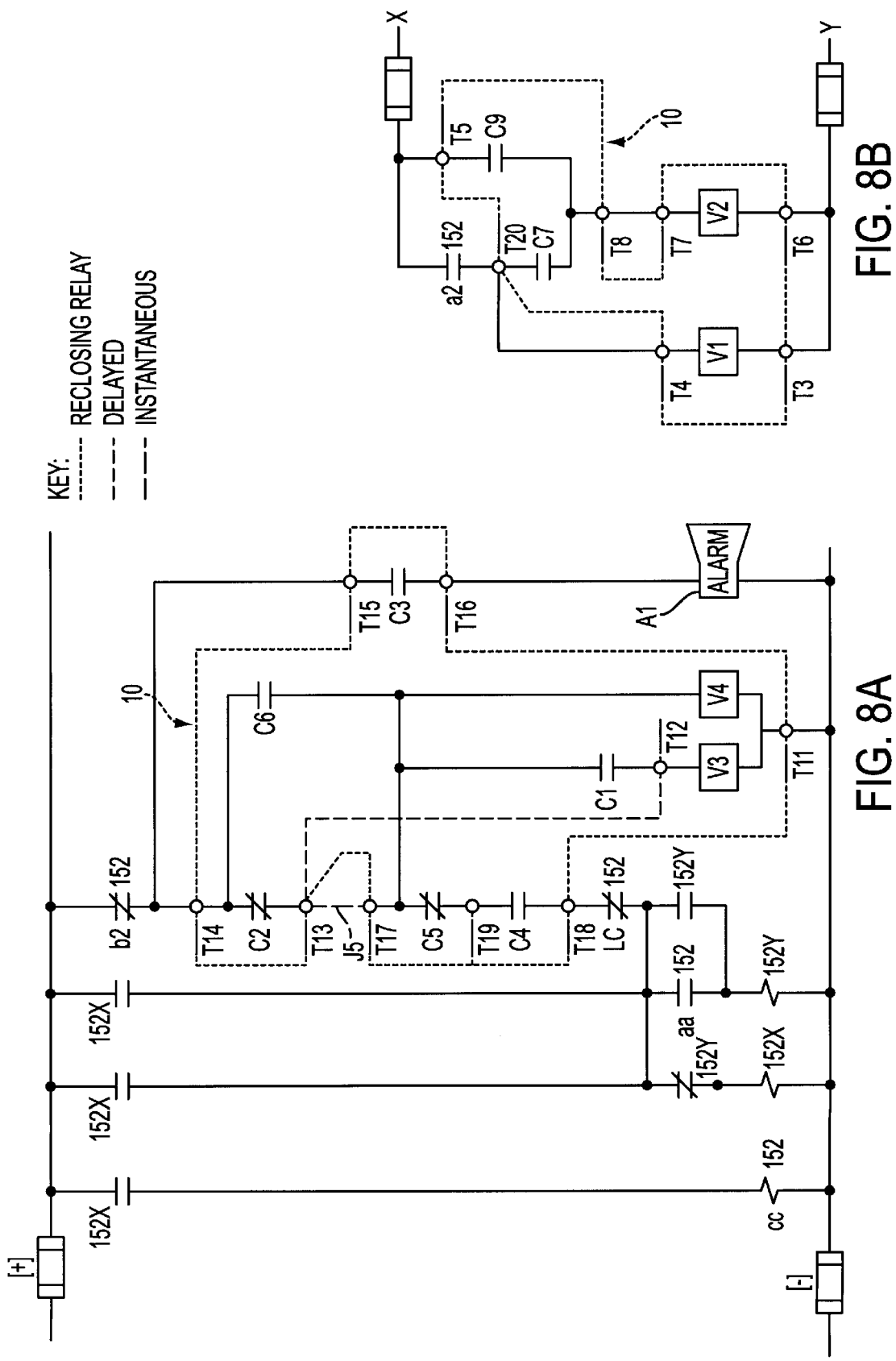

NOTES:
1. ALL RESISTORS ARE 1/8W UNLESS OTHERWISE NOTED.
2. ⚠ COMPONENT NOT USED.
3. ⚠

| COMPONENT DESIGNATOR | -104 (UPRIGHT) | -105 (INVERTED) |
|---|---|---|
| DS1, R21, R37, R42, R45, R47 | NOT USED | INSTALL |
| DS2, R36, R38, R43, R44, R46 | INSTALL | NOT USED |

4. ⚠

| ASSY NUMBER INDICATOR | -104 (UPRIGHT) | -105 (INVERTED) |
|---|---|---|
| 105 | NOT USED | INSTALL |
| 104 | INSTALL | NOT USED |
| 100, 101, 102, 103 | NOT USED | NOT USED |

5. ASSEMBLIES 104 AND 105: Vin = 62-280 VDC; 90-270 VAC

FIG. 12B

RECONFIGURABLE RECLOSING RELAY

This application includes a microfiche appendix comprising a total of two microfiche and a total of 125 frames.

BACKGROUND OF THE INVENTION

1. Field of the Invention

This invention relates to devices and methods useful in electrical distribution systems, and more particularly to a reclosing relay particularly suitable for direct replacement of a variety of existing reclosing relays having different electrical characteristics and connections, and to methods for such replacement.

2. Description of the Prior Art

Reclosing relays are used in substations and feeder lines to automatically reclose a circuit breaker one or more times after it is been tripped by its protective relay. It is been estimated that over 90% of faults occurring on overhead lines are of a temporary nature. For example, a momentary condition caused by a tree limb swaying into a power line in a gust of wind may cause a circuit breaker to open, but the condition that caused the breaker to open will clear as soon as the limb bends back. Such faults may be cleared by momentarily de-energizing the line. Automatic reclosure devices are used in such systems to automatically initiate reclosing impulses to a circuit breaker that has been tripped by its protective relay.

Automatic reclosure devices that are known in the art are basically timing devices. Some of these devices, such as the ACR11 series of mechanical reclosing relays previously manufactured by General Electric Co., included a synchronous motor driving a gear train and a cam shaft with a reset spring through a crown-gear clutch having a magnetic clutch release. These relays contained a series of cam-operated switches, an auxiliary unit, and an interlocking unit. Various designations of non-interchangeable relay types were manufactured by General Electric Co. under this designation, including types ACR11A, ACR11B, ACR11C, ACR11D, ACR11E and ACR11F (hereinafter, ACR11A–ACR11F). All of these models have been discontinued years ago, and are no longer being supplied or maintained by their manufacturer. Thus, they must either be replaced with a unit in inventory or repaired in the event of a failure, or replaced with a newer device that requires substantial rewiring of the case.

Each of the General Electric devices mentioned above (and possibly others from General Electric or other manufacturers) mount in an ACR case. The reclosing relay has two terminal blocks for external connection, one of which is located at the bottom of the unit, and the other one at the top. For at least some models of reclosing relays, the terminal block connections are different from one another. For example, the terminal block connections for the Z coil (an input that is a momentary closure contact that is used to provide an anti-pump function) are at bottom block terminals TB1-7 and TB1-8 in the GE ACR11A device, but are at top block terminals TB2-11 and TB2-17 in the GE ACR11B device. (Terminals are identified as TB1 for the bottom block and TB2 for the top block, with the terminals being numbered from left to right looking from the front.) The differences between these two models are summarized in Tables 1, 2, and 3.

Table 1 shows the terminal connections for the operate coil, reset coil, Z coil (used to provide an anti-pump function), and motor input. Also listed are the reclose, auxiliary, and adjustable auxiliary outputs.

TABLE 1

TERMINAL CONNECTIONS FOR SPECIFIED INPUTS/OUTPUTS

| Input | Output | Location on GE ACR11A | Location on GE ACR11B |
| --- | --- | --- | --- |
| Operate Coil (E set) | — | TB2-11 and TB2-12 | TB2-11 and TB2-12 |
| Reset Coil (E reset) | — | TB1-3 and TB1-4 | TB1-3 and TB1-4 |
| Z | — | TB1-7 and TB1-8 | TB2-11 and TB2-17 |
| Motor | — | TB1-5 and TB1-6 | TB1-6 and TB1-7 |
| — | Reclose | TB2-18 | TB2-18 |
| — | Auxiliary | TB1-1 and TB1-2 | TB1-1 and TB1-2 |
| — | Adjustable Aux. | TB1-9 and TB1-10 | TB1-9 and TB1-10 |

The wiring internal to the units are also greatly different. Table 2 shows each contact and where it is located. (Contact names may be found in instruction booklet GEH-1786F for reclosing relays GE ACR11B, GE ACR11C, and GE ACR11F, and in instruction booklet GEH-1761 for "Switchgear Reclosing Relay Type ACR11A," both published by General Electric Co.).

TABLE 2

DIFFERENCES IN CONTACT LOCATIONS, GE ACR11A vs. GE ACR11B

| Input | Contact Name | Location on GE ACR11A | Location on GE ACR11B |
| --- | --- | --- | --- |
| Operate or Reset Coil (E Set or Reset) | E1 | TB2-13 and TB2-14 | TB2-13 and TB2-14 |
|  | E2 | TB1-3 and TB1-4 | TB1-3 and TB1-4 |
|  | E3 | TB1-5 and TB1-6 | TB1-5 and TB1-8 |
|  | E4 | TB1-1 and T1-2 | TB1-1 and TB1-2 |
|  | E5 | (n/a) | TB2-18 and TB2-19 |
|  | E6 | (n/a) | TB2-12 and TB2-17 |
| Z | Z1 | TB2-15 and TB2-20 | TB2-14 and TB2-17 |
|  | Z2 | TB2-17 and TB2-18 | TB2-12 and TB2-17 |
|  | Z3 | TB2-19 and TB2-20 | TB2-17 and TB2-19 |
| Motor | AB | TB2-17 and TB2-20 | TB2-17 and TB2-19 |
|  | BC | TB2-15 and TB2-20 | TB2-14 and TB2-17 |
|  | DE | TB1-3 and TB1-4 | TB1-3 and TB1-4 |
|  | GH | TB1-5 and TB1-6 | TB1-5 and TB1-8 |
|  | HI | (n/a) | TB1-8 and TB2-20 |
|  | JK | TB2-15 and TB2-16 | TB2-15 and TB2-16 |
|  | KL | TB2-15 and TB2-20 | (n/a) |
|  | MN | TB1-3 and TB1-4 | TB1-3 and TB1-4 |
|  | RS | TB1-9 and TB1-10 | TB1-9 and TB1-10 |

Finally, another way to distinguish between the GE ACR11A and GE ACR11B is in the location of the reclosing, reset, and motor circuits. Table 3 lists the location of these circuits in these types of reclosing relays.

TABLE 3

LOCATION OF RECLOSING, RESET AND MOTOR CIRCUITS

| Circuit | Location on GE ACR11A | Location on GE ACR11B |
|---|---|---|
| Reclose | TB1-1, 2, 7, 8, 9, 10 and TB2-11 through 20 | TB1-1, 2, 9, 10, and TB2-11 through 19 |
| Reset | TB1-3 and TB1-4 | TB1-3 and TB1-4 |
| Motor | TB1-5 and TB1-6 | TB1-5, 6, 7, 8, and TB2-20 |

It should be noted that the GE ACR11C, GE ACR11D, GE ACR11E, and GE ACR11F models have the same terminal connections as the GE ACR11B model. Therefore, where a reclosing relay having the terminal connections of the ACR11B is referred to (in this description and the claims), this reference should be understood to mean any of the GE ACR11B, GE ACR11C, GE ACR11D, GE ACR11E, and GE ACR11F model relays. Tables 1, 2, and 3, however, should make it clear to the reader that an ACR customer cannot interchange a relay having terminal connections of the GE ACR11A reclosing relay with one having the terminal connections of an GE ACR11B reclosing relay (and vice versa), but must (at least) specify which of these models is needed when replacing a unit in the field.

However, merely specifying the model type is also not sufficient, as other differences exist between models installed for use in the field. For example, the "B" model attempts a reset 10 seconds after each reclose attempt. The "C" style does not have this ability and will only reset after a full cycle has completed. Thus, if a "B" style has a successful reclose at 20 seconds into a sequence, it will attempt to reset at 30 seconds. The "C" style, by contrast, will wait 185 seconds to attempt a reset. The reset modes are not interchangeable and neither style can be set to function like the other. "B" and "E" style relays also differ in that the "E" style, unlike the "B" style, has a dual rated 115/230 Vac motor. The "F" style also has a dual rated motor, but the "C" style does not.

In addition to the differences highlighted above between models, variations occur even in reclosing relays of the same model, because the motor, reclose, and reset circuits may have been configured to operate on various voltages. A substation using a reclosing relay, for example, always has either 115 or 230 Vac available for the motor. A station battery of 48, 125, or 250 Vdc would also usually be available, in addition to the 115 or 230 Vac sources, for the reclose and reset circuits. This combination of sources suggests a large number of supply voltage configurations for the three circuits is possible. It is not known whether relays have been configured for all possible permutations of supply voltages, but many configurations are certainly being used. In any event, relays are in use where at least two and perhaps even three different supply voltages are used to energize the relay.

Although not all the possible permutations of the General Electric ACR11A–F models may have been produced, it is estimated that it would require at least 100 distinct relays in inventory, plus a large stock of replacement parts, to cover all of the configurations of these relays that are in use, many of which are non-interchangeable with one another. Such a large replacement inventory would be found impractical, especially for a device that is no longer being made or supported by the manufacturer. The estimate of the number of configurations needed may increase if other manufacturer's products, such as those of Westinghouse Electric Co., also have to be supported.

It would therefore be advantageous to provide a method for the field replacement of any of various configurations of installed reclosing relays that does not depend upon having each particular model or configuration of reclosing relay in inventory. It would also be advantageous to provide a device that can be directly retrofit into an installation requiring one of a variety of models and configurations of these prior art reclosing relays without requiring rewiring of the case or the relay. It would further be advantageous if the replacement device did not require a complex motor (such as employed by the General Electric ACR11A–F series devices) with moving parts that wear out, and which therefore require a stock of difficult-to-obtain replacement parts. It would also be advantageous if the replacement device could be made even more reliable through the elimination of unneeded relay contacts. Obviously, it would be yet another advantage if these goals could be realized in a low-cost unit with added functionality.

BRIEF SUMMARY OF THE INVENTION

It is therefore an object of this invention to provide a method for replacing various models and configurations of reclosing relays in a power distribution system or substation without requiring that the various models and configurations be kept in inventory.

It is a further object of the invention to provide a device that can be directly retrofit into an installation, replacing any of a variety of models and configurations of the prior art reclosing relays without rewiring of the case or of the replacement relay.

It is yet another object of the invention to provide a replacement relay without a complex motor having moving parts that must be replaced as they wear out.

It is a still further object of the invention to provide a reclosing relay of high reliability through a reduction in the number of moving parts in the relay.

It is yet an additional object of the invention to provide a low-cost reclosing relay suitable for plug-in replacement and having added functionality compared to the unit being replaced.

These and other objects and advantages of the invention are achieved by a reclosing relay having electrical terminals configured in a manner physically compatible with those of the GE ACR11 series reclosing relays, so that the reclosing relay chassis may be inserted into a case designed for a GE ACR11 model relay. The electrical connections to these terminals inside the inventive reclosing relay can be changed in the field by setting switches on the relay. The available settings are such as to allow the inventive relay to emulate the external sensing and control functions of the GE ACR11 series relay (or other similar relay) being replaced. In addition, the inventive relay preferably emulates the motor-driven control functions of the prior art relay being replaced with a microcomputer for the operation of sensing and control functions. The microcomputer can receive information from wide-range sensors that allow drop in replacement in a wide variety of sensor voltage ranges, and can control the operation of relays that provide external control functions. A communication port can be provided to allow programming of resetting times and other functions of the reclosing relay, so that a wide variety of prior art relays can be replaced, and new and improved functionality added.

Therefore, in accordance with a first aspect of the invention, there is provided a reclosing relay for power distribution systems, said reclosing relay being physically compatible with a relay case adapted to receive either one of a motor-driven relay of a first type and a motor-driven relay of a second type, said reclosing relay being selectively configurable for emulating a functional operation of either one of the motor-driven relay of the first type and the motor-driven relay of the second type.

In accordance with another aspect of the invention, a reclosing relay is provided for use in a power distribution system comprising: a chassis; a plurality of electrical contacts including electrical contacts at which applied voltages are sensed and electrical contacts for switching electrical circuitry external to the chassis; a controller responsive to the applied voltages for operably controlling electrical circuitry connected externally to said chassis via the electrical contacts; and switches adapted to selectively reconfigure operable connection of the electrical contacts to the controller, the electrical contacts, controller, and switches being housed by the chassis.

In accordance with yet another aspect of the invention, there is provided a reclosing relay comprising: a plurality of input sensors configured to sense signals at some of a plurality of electrical contacts; a plurality of output relays operably coupled to some of the plurality of electrical contacts, the input sensors and output relays thereby forming a group of contact-connected elements; a programming input port; a microcomputer including a stored program for selectively emulating one of a plurality of configurations for controlling the plurality of output relays, the microcomputer being responsive to a first subset of the plurality of input sensors for operably controlling at least a subset of the plurality of output relays in accordance with data input to the programming input port; and a chassis housing the plurality of electrical contacts, the plurality of input sensors, the plurality of output relays and the microcomputer.

In accordance with yet another aspect of the invention, there is provided a method for replacement of a reclosing relay in a distribution system, the method comprising the steps of: removing a previously installed reclosing relay from a case having a first set of electrical contacts adapted to operably mate with a set of electrical terminals on the previously installed reclosing relay prior to its removal; providing a replacement reconfigurable reclosing relay having a second set of electrical contacts adapted to operably mate with the set of electrical terminals when the replacement reconfigurable reclosing relay is installed in the case; installing the replacement reconfigurable reclosing relay in the case; and configuring the replacement reconfigurable reclosing relay to emulate the operation of the previously installed relay.

The inventive reclosing relay replaces the motors and cams of prior art reclosing relays with voltage sensing circuits, conventional output contacts, and a microcomputer. The voltage sensing inputs sense voltage that would be present at the prior art motor, E operate, E reset/Clutch and Z coil connections of the prior art relay. In addition, one input senses whether operating voltage is present for the power supply. The microcomputer performs logic based upon these inputs, and simulates, via timed loops, the rotation of an ACR motor. At points that the motor would be operating a cam, the microcomputer initiates the operation of an output contact. Replacement of an existing GE ACR series reclosing relay is accomplished in a simple manner by programming the microcomputer via the communication port, setting a few switches, and plugging the replacement relay directly into the case of the existing relay.

The inventive relay embodiment described herein replaces all known styles of GE ACR11A, GE ACR11B, GE ACR11C, GE ACR11E, and GE ACR11F relays in most applications. (Possibly excluded are specially modified versions of these relays and/or low volume, short life span versions, if such exist.) Each of these prior art relays is available in at least 3 to 6 styles. This means that a customer can use the inventive relay to replace any of approximately 20 different prior art relay styles, simplifying stocking and reducing stocking costs. In addition, the relay provides added functionality, more precise settings, and reduced equipment costs.

These and other aspects of the invention are more fully described in the attached figures and in the detailed description below. It will be evident to one skilled in the art from study of this descriptive material that it is not necessary in all cases to incorporate all of the inventive features into a particular device or method. In such cases, however, less than all of the possible advantages of the invention may be achieved.

BRIEF DESCRIPTION OF THE FIGURES

FIG. 8A and FIG. 8B are sections of a simplified schematic diagram of a typical configuration of the reclosing relay of FIG. 1 in circuit in an application requiring terminal connections of a GE ACR11B closing relay;

DETAILED DESCRIPTION OF THE INVENTION

Figure 1:
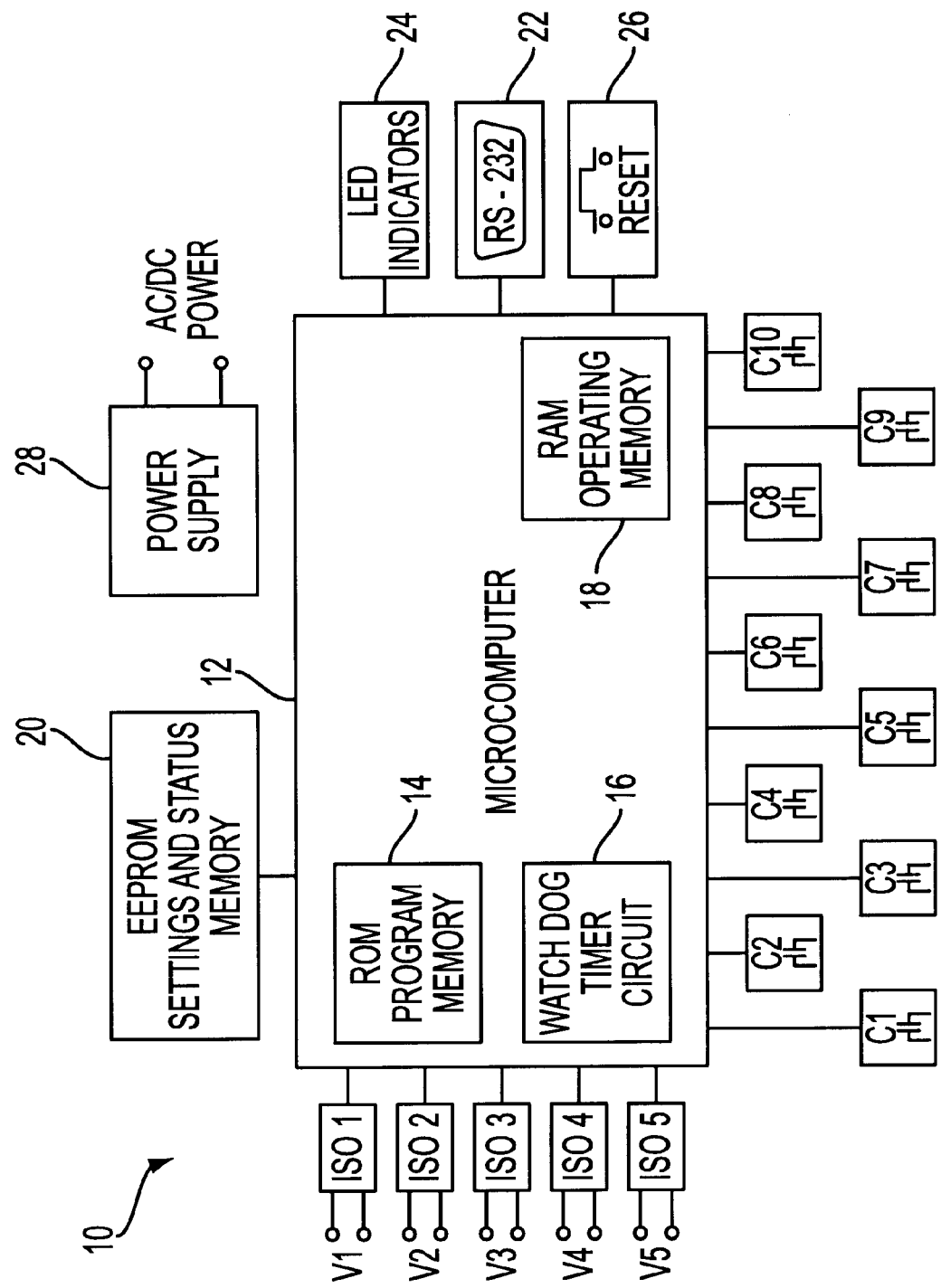
FIG. 1 is a simplified functional block diagram of a reclosing relay in accordance with the invention.

FIG. 1 is a simplified functional block diagram of a first embodiment 10 of the inventive reclosing relay. Unlike the prior art reclosing relays that it replaces, reclosing relay 10 is controlled by a microcomputer 12. Microcomputer 12 includes a program memory 14, such as a ROM, in which a program is stored. The program may preferably be one that allows microcomputer 12 to control reclosing relay 10 in a manner that causes it to emulate a plurality of different reclosing relays that reclosing relay 10 is intended to replace, if reclosing relay 10 is intended for field replacement use. Alternately, or in addition, the program stored in program memory 14 may instead by one that causes microcomputer 12 to provide improved performance for reclosing relay 10, with or without the emulation of prior art reclosing relays. Operating memory 18, such as RAM, is also provided for microcomputer 12. A watch dog timer circuit 16 may preferably be provided to ensure recovery of microcomputer 12 from hardware and software faults that may occur within reclosing relay 10 itself. Additional memory 20, preferably in the form of electrically erasable programmable read-only memory (EEPROM) is preferably provided for configuration setting and status memory, both of which should be maintained in the event of a power failure.

It will be recognized that ROM 14, RAM 18, watch dog timer 16. and perhaps other components such as EEPROM 20 may be integral to microcomputer 12, which may itself be a single chip device. Because high speed operation is generally not required, a wide variety of design choices for implementation of microcomputer 12 are available consistent with the physical size limitations imposed with the intended use of reclosing relay 10, including field replacement of prior art units. An eight-bit microprocessor with integral ROM and RAM has been successfully used for microcomputer 12.

A communications port 22, such as an RS-232 serial port, is provided for communication of configuration information from an external source to microcomputer 12. Port 22 can be bi-directional, to allow microcomputer 12 to transmit state information to a terminal (not shown) attached to port 22. Status indicators 24 such as LEDs may be provided for this purpose, preferably on a front panel of reclosing relay 10. A reset switch 26 is preferably also provided to ensure that microcomputer 12 can be restarted from a known state if necessary.

Microcomputer 12 senses states of a circuit breaker via a plurality of sensors such as ISO1–ISO5, which may comprise wide-range optoelectronic isolators. Sensors of this type are available in, or can be configured for, sensing the application of both DC from 28–250 Vdc and AC voltages 115–230 Vac. (Sensors capable of sensing at least these voltage ranges may be considered as "wide-range" for purposes of this description.) The sensing elements ISO1–ISO-5 convert the externally-applied voltages to signals that can safely be handled by microcomputer 12. Sensing terminal pairs V1–V5 corresponding to sensors ISO1–ISO5 are shown and separately labeled in FIG. 1. Sensing terminal pairs V1–V5 are brought out to external terminals of reclosing relay 10 in a manner to be described below. In response to the sensing input, microprocessor 12 is programmed to operate a plurality of relay contacts, such as C1–C10. The terminal pairs of relays C1–C10 are not shown in FIG. 1, but are also connected to the external terminals of reclosing relay 10 in a manner described below. In a preferred embodiment suitable for field replacement of General Electric Co. relays ACR11A through ACR11F, five sensing terminal pairs V1–V5 are provided, and ten relay contacts C1–C10 are provided. In this embodiment, of the ten relay contacts, C3 and C8 are configured as, or configured to emulate, normally closed relays, while the remainder are configured as, or configured to emulate, normally open relays.

Figure 2:
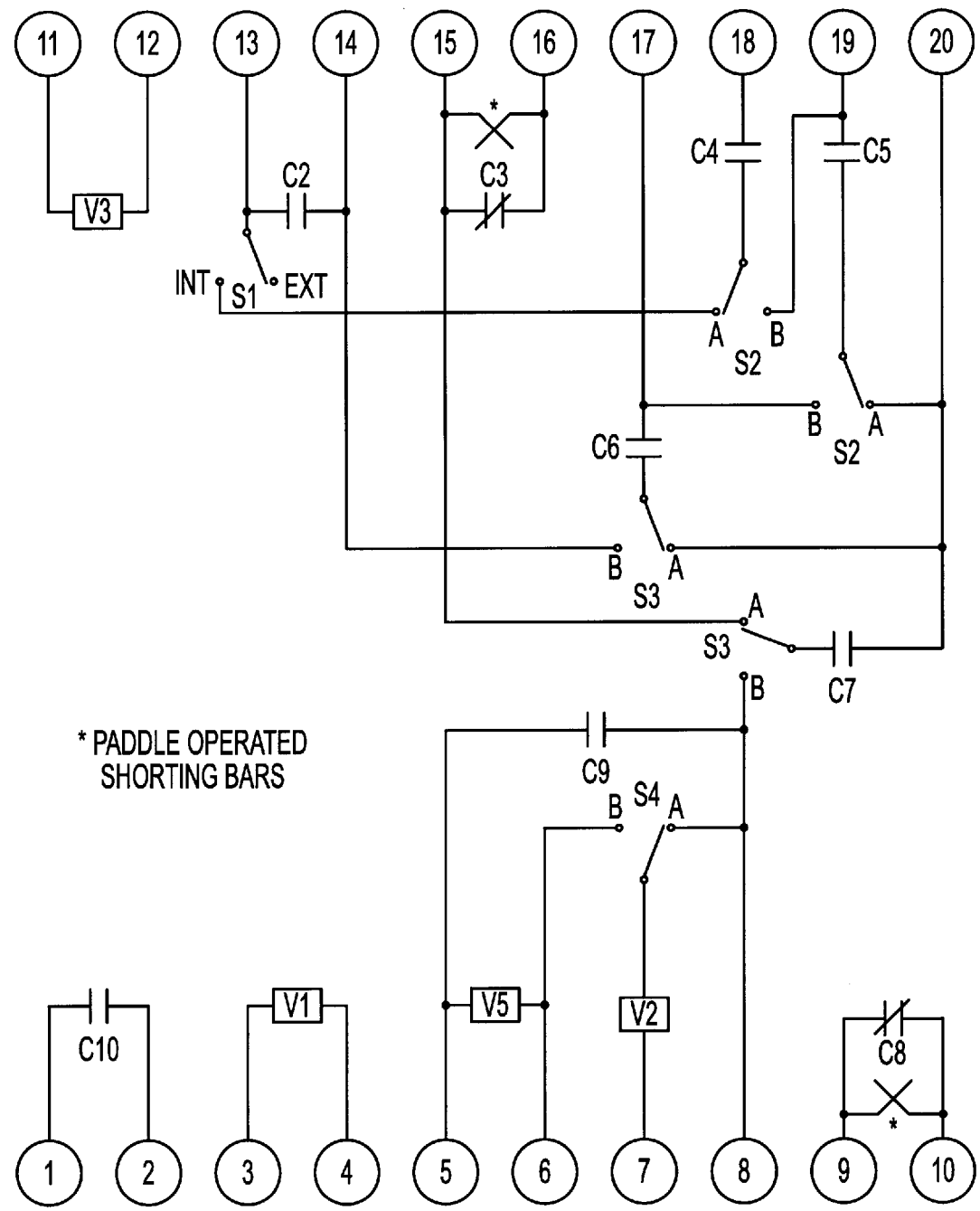
FIG. 2 is a block diagram showing switch settings required for an embodiment of the reclosing relay in accordance with the invention to emulate terminal connections of a GE ACR11A reclosing relay.
Figure 3:
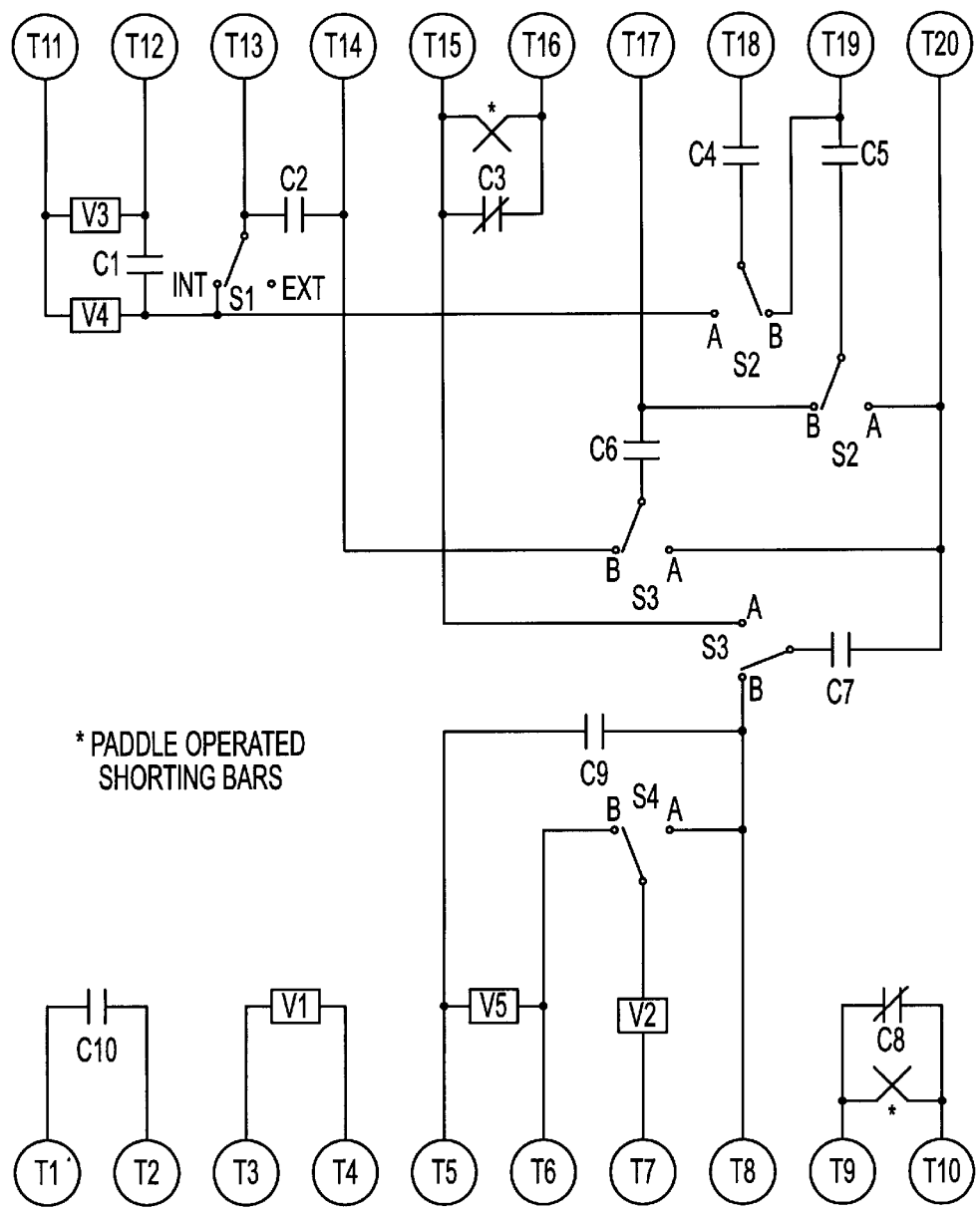
FIG. 3 is a block diagram showing switch settings required for an embodiment of the reclosing relay in accordance with the invention to emulate terminal connections of a GE ACR11B reclosing relay.

In a preferred embodiment intended for replacement of GE reclosing relays ACR11A–ACR11F, switches S1, S2A, S2B, S3A, S3B, and S4 (shown in FIG. 2) are provided to electrically reconfigure sensing terminal pairs V1–V5 and relay contacts C1–C10 to provide emulation of the functions of terminals T1–T20 of either GE ACR11A or ACR11D. (The other GE models ACR11C–ACR11F can be emulated by the same switch settings used to emulate the GE ACR11B.) The switch settings shown in FIG. 2 provide emulation of GE ACR11A. The switch settings shown in FIG. 3 provide emulation of GE ACR11B–ACR11F. These switches provide reconfiguration without requiring a permanent rewiring of contacts or of the relay case.

In addition to switch settings, the software running microcomputer 12 also affects the operation of reclosing relay 10, as will now be described.

In operation, reclosing relay 10 is generally in one of three states: reset, reclosing (or timing) sequence, or lockout. A reclosing sequence can be entered only from the reset state. A reclosing sequence cannot be started from the lockout state. A front panel visual indication of which state the relay currently is in may be provided by LED indicators 24.

For the relay to reach the reset state, the breaker it is controlling must be closed at some point within three seconds after a reset timer expires. If the breaker is open prior to the expiration of this three-second period, the relay attempt to reclose the breaker again, unless a preprogrammed number of reclosing attempts has been tried. If the breaker remains open after this preprogrammed number of reclosing attempts, the relay will enter the lockout state. The lockout state may also be entered by reclosure failure.

In the lockout state, relay operation is inhibited. Microcomputer 12 may be programmed as required, preferably via external communication port 22, to select whether a lockout state is entered when a failure to reclose the relay within the specified number of attempts occurs. Failure is indicated by an alarm output relay closing in the reclosing relay, which may be used to connect power to a signaling device. The front panel indicators 24 may also provide a distinctive indication when a failure occurs. If a lockout condition on failure is selected, output C3 is programmed to close during a failure, so that the circuit breaker must be manually reset (or reset by other means) and remain closed for the duration of the final reset time delay setting for the lockout state of the reclosing relay to terminate.

A reclosing sequence is initiated by the closure of a 52B contact in a circuit breaker, signifying that the breaker has tripped. ("52B" and "52A" are standard IEEE designations for certain contacts of a circuit breaker that provide information concerning the state of the circuit breaker.) A reclosing sequence is preferably indicated by a separate LED indicator, such as one of LED indicators 24 on the front panel of the reclosing relay. Preferably, up to four automatic reclosure attempts are made by the reclosing relay, with the number being selectable by data input via external communication port 22. In a preferred embodiment, each reclosure setting is separately adjustable within a range of 0 to 300 seconds, in 0.1 second intervals, while the number of reclosing attempts may be limited by setting one of the reclose time delay settings to zero. If the breaker trips after the programmed maximum number of reclosing attempts has been attempted, a failure or a lockout will result. The first reclosing attempt may be made instantaneous by connecting a jumper. For GE ACR11B emulation, this jumper is connected across case terminals 13 and 17 or a switch mounted on the right side of the reclosing relay.

In a preferred embodiment, each of the four reclose settings has a corresponding reset timer. A final reset controls the time between lockout and reset. Each reset setting is adjustable and has a setting range of 0 to 300 seconds. Pressing the momentary front panel reset switch 26 clears a reclosing sequence and returns the relay to the reset mode. The reclose and reset timer settings in a typical reclosing relay may be based on the breaker opening that immediately precedes each reclose and reset setting. However, in a preferred embodiment of this invention, each reclose and reset timer setting is based on the breaker opening that initiates the first reclose timer. This typically makes the first reclose setting the shortest time setting and the fourth reclose setting the longest time setting.

Figure 4:
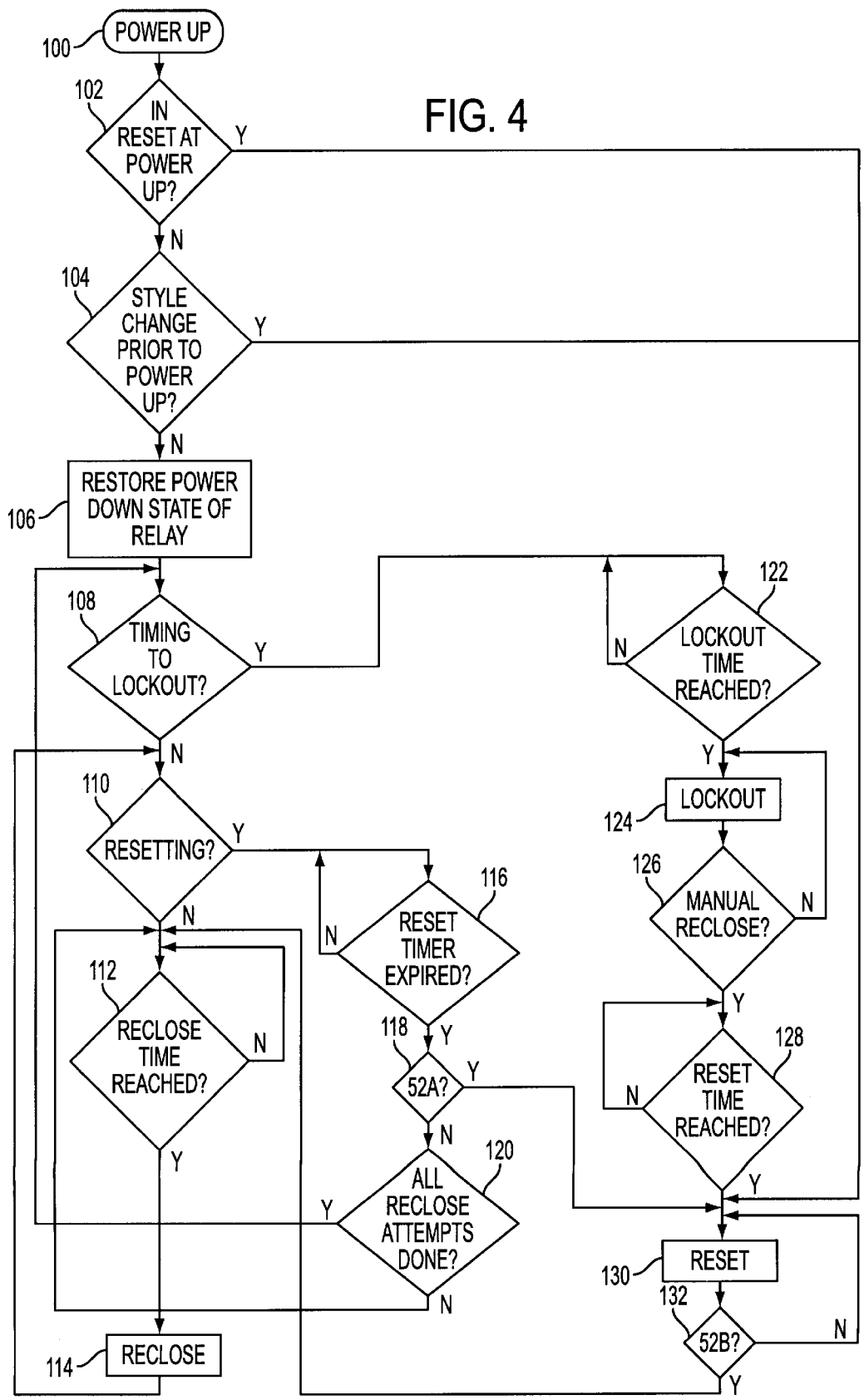
FIG. 4 is a power-up flow chart of a program controlling the microcomputer of the reclosing relay shown in FIG. 1.

FIG. 4 is a power-up flow chart of the operation of microcomputer 12 in a preferred embodiment. Starting at power-up block 100, a test is made at block 102 to determine whether a reset condition exits at power-up, as would occur if the relay was in a reset condition when power was previously lost. If so, this signifies a non-fault condition, and software control is passed to block 130, which represents a routine, to be described in more detail in a subsequent section, in which the reclosing relay 10 performs most of its normal functioning. Otherwise, if the relay was not in a reset condition at power-up (e.g., it was in a reclose cycle when it lost power), control is passed to decision block 104.

Although unlikely, it is possible that the configuration of reclosing relay 10 may have been changed between the previous power-down and the present power-up cycle. Such a change may occur, for example, if reclosing relay 10 is removed from service and reinstalled in another location. If a configuration change has occurred, decision block 104 passes control directly to reset block 130. Otherwise, control is passed to block 106, where the position of relay contacts C1–C10 in the power down state is restored. After block 106, control passes to block 108, where the state of a "lockout" timer is tested. "Lockout" is a state in which relay operation is inhibited. The state can be produced either by a failure of the controlled circuit breaker to reclose, or by the circuit breaker tripping more times in succession than the maximum programmed number of reclosure attempts. If, when power was last interrupted, reclosing relay 10 was not timing to reach a lockout state, control passes to decision block 110. If reclosure relay 10 was timing to reach a lockout state, control passes to decision block 122.

Decision block 122 provides a delay timer that delays transfer of control to block 124 until a lockout timer expires. Once control is passed to block 124, the relay is in a lockout state. This state is preserved by a loop established between blocks 124 and 126, and terminates when the controlled circuit breaker is closed (manually or by other means). Once the circuit breaker is closed, the program reaches block 130, the reset state, after expiration of the final reset time delay in decision block 128.

If the reclosing relay is not timing to a lockout state at block 108, control passes to block 110 in which it is determined whether the relay was in the process of resetting when power was last interrupted to the relay. For the relay to have reached this state, the circuit breaker being controlled by the relay must have been closed by the reclosing relay when a reclose timer expired prior to power down. If so, control is passed to block 116.

Decision block 116 provides a delay until the reset timer expires before passing control to decision block 118. Decision block 118 checks the condition of contact 52A ("52A" is a standard IEEE identification code for a normally closed relay contact in the circuit breaker that is sensed by the reclosing relay controlling the circuit breaker). If the 52A contact indicates that the circuit breaker has entered closed during the reset time period, control passes to block 130. Otherwise, control passes to block 120, where another reclosing attempt may be initiated.

Block 120 is a test to determine whether all of the reclose attempts allowed by the programming of the reclosure relay have been performed. If so, control returns to block 108, described above. Otherwise, control passes to block 112, which provides another delay of a programmed duration, until a reclosure attempt (or another reclosure attempt) is performed at block 114. Control then passes to block 110, so that the success of this attempt can be determined and appropriate action taken.

Eventually, if the circuit breaker controlled by the reclosing relay is closed, reset block 130 is reached, and a loop consisting of block 130 and 132 is repeatedly executed by the reclosing relay's microcomputer. This loop is executed only when a reclosing sequence is initiated by closure of a 52B contact. In a preferred embodiment, a selectable number of automatic reclosure attempts (up to four) may take place before a lockout occurs. The operation of this loop (which may be regarded as a more detailed expansion of the loop starting with reset block 130 of FIG. 4) is detailed in FIGS. 5A, 5B, and 5C.

Figure 5A:
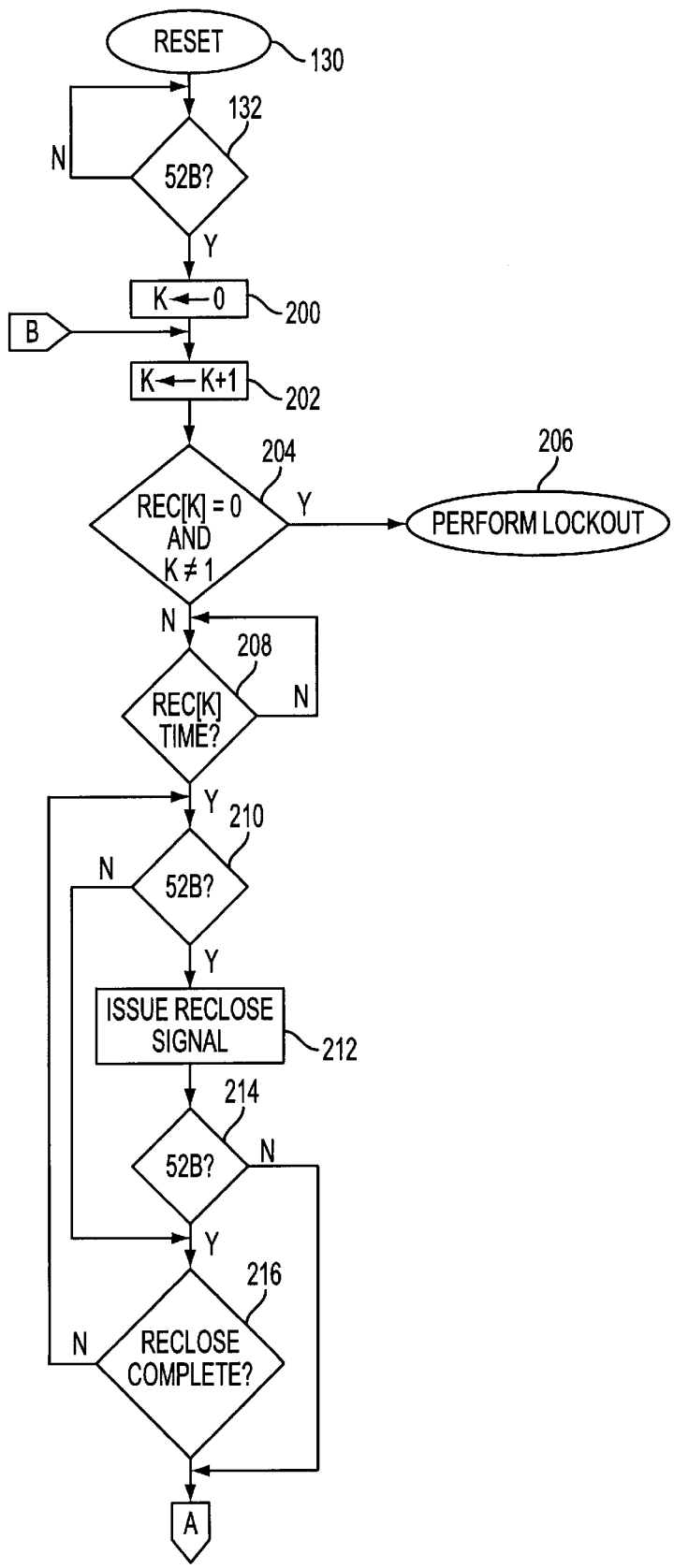
FIG. 5A, FIG. 5B, and FIG. 5C are sections of a flow chart showing more detailed operation of a main loop of the program illustrated in FIG. 4.

Starting at FIG. 5A, after reset block 130 is executed, a test is made at block 132 to determine whether breaker contact 52B is closed. If not, the test is repeated until a closure is detected. Blocks 200 and 202 are then executed, which set up a loop for up to four automatic reclosures. The number of reclosing attempts may be limited by setting the reclose time delay setting of any reclosure attempt, after the first, to zero, so a check is made at block 204 to determine whether this is has been done for the time delay setting corresponding to the current reclosure attempt. If so, a lockout is performed by transfer to block 206. Otherwise, a delay loop is performed at block 208 until the current (i.e., the Kth) reclosure time has elapsed. Then breaker contact 52B is checked again. If the relay contact is still open, a relay closure signal is issued to the circuit breaker at block 212. Otherwise, a further check is made to determine whether the reclosure is complete at block 216.

Figure 5B:
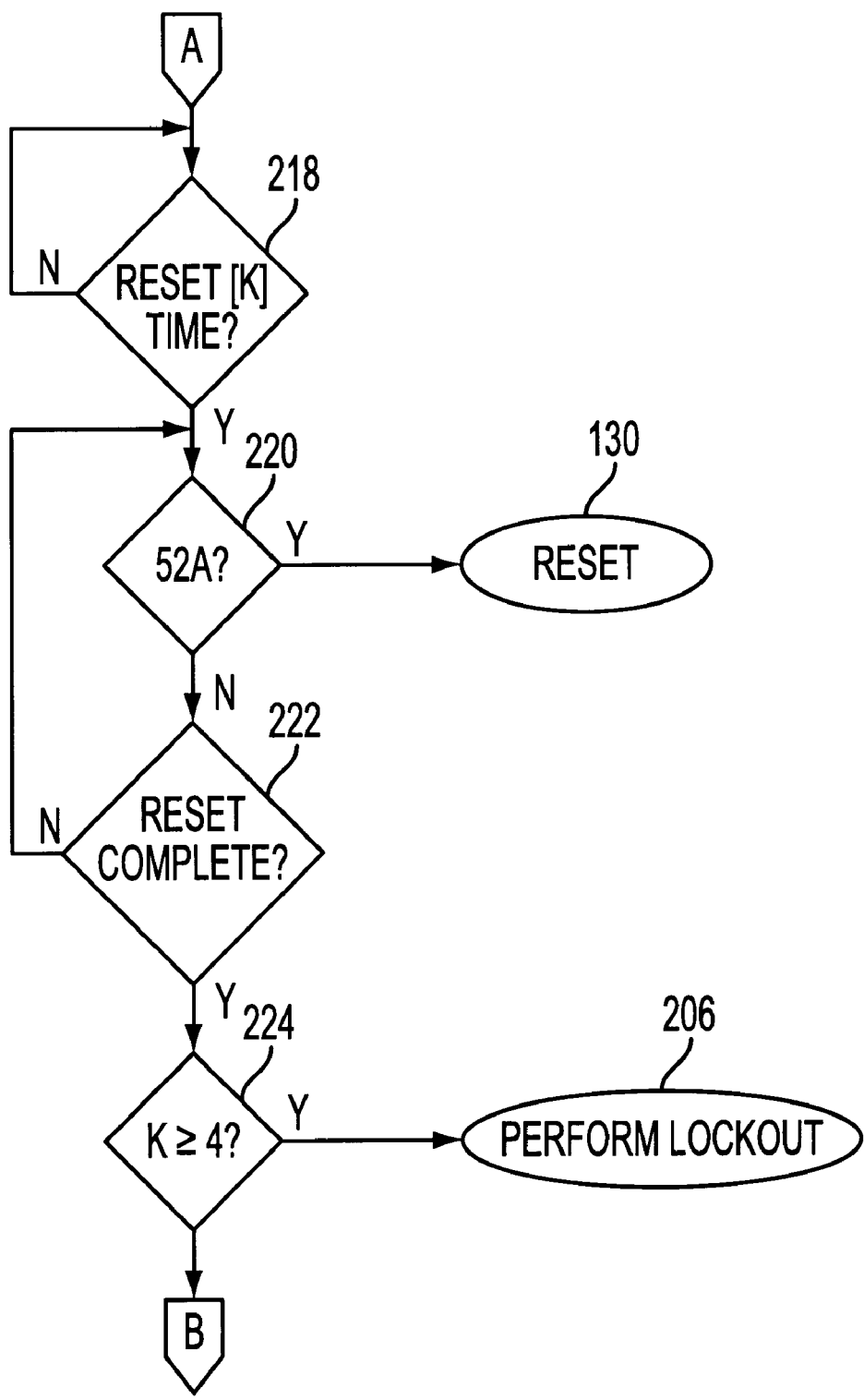

If a reclosure signal is issued at block 212, yet another check is performed of breaker contact 52B to prevent the circuit breaker from "pumping." If this check indicates that the breaker is still open, block 216 is entered, otherwise it is bypassed, and control continues at block 218 in FIG. 5B. Execution from block 216 also continues at block 218 unless the reclose is not complete, in which case, it loops back to block 210. The reclose complete check at block 216 is primarily intended to ensure that a reclose signal is sent for a long enough time to the circuit breaker.

Continuing at block 218 in FIG. 5B, a check is made to determine whether the reset timer for this, the Kth reset attempt, has expired. If not, looping at block 218 occurs until it has been completed, at which time execution continues at block 220. Block 220 confirms reset by checking circuit breaker contact 52A. If this contact is closed, the reset state is reentered at 130. Otherwise, block 222 is entered, which sets up a loop to perform the check at block 220 for three seconds (which corresponds to the time that the "MN" contacts of a circuit breaker ACR would be closed). If the reset complete time has expired, a check is then made at block 224 to determine whether the maximum number of reclosing attempts allowed by the reclosing relay (in this case, four attempts) has been tried. If so, lockout is performed at block 206. Otherwise, the loop is reentered at block 202 of FIG. 5A for the next reclosing attempt.

Figure 5C:
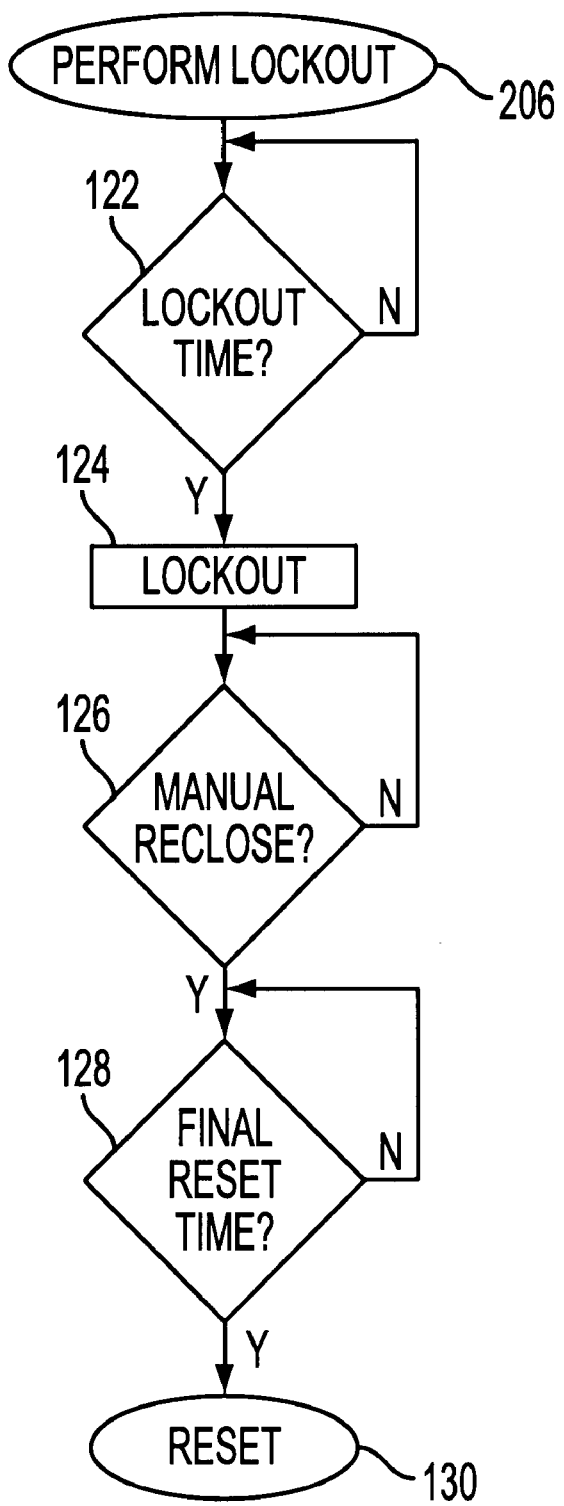
Figure 6:
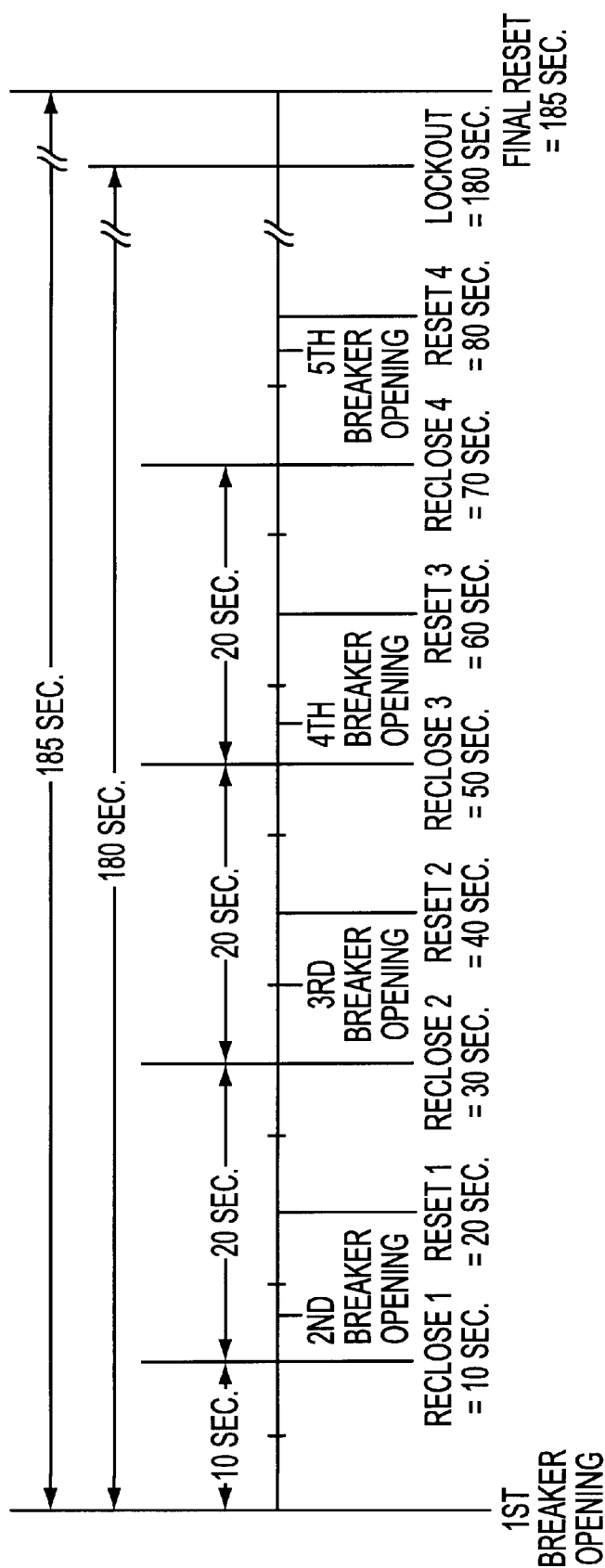
FIG. 6 shows a time line of a typical reclosing sequence initiation and progression for a selected set of reclose time delay settings for the relay shown in FIG. 1.

FIG. 5C shows a flow chart of the "perform lockout function" of block 206. The flow chart shown in FIG. 5C represents a portion of the flow chart shown in FIG. 4. FIG. 6 shows a simplified representation of a typical reclosing sequence initiation and progression for a selected set of reclose time delay settings. The total time to a final reset shown in FIG. 6 is 185 seconds, although this time, as well as the others shown as well as the number of reset attempts may vary, depending upon instructions that may be field-programmed into the reclosing relay via communications port 22.

Referring again to FIG. 1, FIG. 2, and FIG. 3, depending upon the selected configuration settings. the contact sensing input functions and the output functions vary. For the embodiment and switch setting illustrated in FIG. 2, in which a GE ACR11A is emulated, the functions of the contact sensing inputs are as described in Table 4. The General Electric nomenclature for each input is provided in parentheses following each description.

TABLE 4

CONTACT SENSING INPUT DESCRIPTION FOR GE ACR11A EMULATION

| Input | Terminals | Description |
| --- | --- | --- |
| V1 | 3,4 | This input is typically connected to a 52A contact which results in voltage being sensed when the breaker is closed. If V1 senses voltage within 3 seconds after the Reset 1, 2, 3, or 4 timer expires, a reset will be initiated. If the relay is in Lockout, a reset will be initiated anytime V1 senses voltage. (E reset) |
| V2 | 7,8 | This input is connected to a 52B contact which results in voltage being sensed when the breaker is open. This input is typically used to provide an anti-pump feature. If voltage is removed from V2 during a reclose attempt, the anti-pump feature will prevent a further reclose attempt until the next reclose set time is reached, thereby preventing multiple reclose attempts for a single reclose setting. (Z) |
| V3 | 11, 12 | This input is used to monitor the 52B contact while the relay is in a reset condition. When V3 senses voltage, the relay initiates a reclose sequence. (E operate) |
| V4 | — | Not used in this application |
| V5 | 5, 6 | This input is internally connected to the relay power supply terminal. A loss of sensing voltage at this input will cause the relay to store all necessary data in memory. |

Table 5 describes the function of the ten outputs of reclosing relay 10 when the device is configured for GE ACR11A emulation.

TABLE 5

OUTPUT DESCRIPTION FOR GE ACR11A EMULATION

| Output | Terminals | Description |
| --- | --- | --- |
| C1 | — | Not used in this application |
| C2 | 13, 14 | This output is closed during reset and open when the voltage at input V3 is sensed. During a reclose sequence, C2 will remain open until the relay returns to reset. (E1) |
| C3 | 15, 16 | This output functions as a programmable alarm contact. It can be set to function as a Relay Fail output or a combination Relay Fail/Lockout output. (JK) |
| C4 | 17, 18 | This output is used in conjunction with the anti-pump function. C4 is closed when voltage is sensed at input V2. (Z2) |
| C5 | 19, 20 | This output is used in conjunction with the anti-pump function. C5 is closed when voltage is sensed at input V2. (Z3) |
| C6 | 17, 20 | This Reclose output closes for three seconds after a reclose timer expires. (AB) |
| C7 | 15, 20 | This Anti-Pump output closes for the duration of a reclosing timing except if output C6 closes. If C6 closes, output C7 will close only if voltage is sensed at contact sensing input V2. (BZ + Z1) * KL |
| C8 | 9, 10 | This RS output can be configured as a normally open or normally closed contact. The output can be set to energize for an adjustable duration after the start of a reclose cycle. The interval between the reclose sequence start and C8 energizing is also adjustable. |
| C9 | — | This output is not used in this application. |
| C10 | 1,2 | This output is closed during a reset condition and open when a reclose timing begins. (E4) |

When reclosing relay 10 is configured for GE ACR11B operation, the contact sensing input description is the same as when it is configured for GE ACR11A operation, with the exception of the inputs listed in Table 6.

TABLE 6

DIFFERENCES IN CONTACT SENSING INPUTS WHEN CONFIGURED FOR GE ACR11B OPERATION

| Input | Terminals | Description |
| --- | --- | --- |
| V2 | 7,8 | Voltage sensed at this input causes the relay to start a reclose sequence. (Motor) |
| V4 | 11, 17 | This input is connected to a 52B contact which results in voltage being sensed when the breaker is open. This input is typically used to provide an anti-pump feature. If voltage is removed from V2 during a reclose attempt, the anti-pump feature will prevent a further reclose attempt until the next reclose |

TABLE 6-continued

DIFFERENCES IN CONTACT SENSING INPUTS WHEN CONFIGURED FOR GE ACR11B OPERATION

| Input | Terminals | Description |
|---|---|---|
| | | set time is reached. This prevents multiple reclose attempts for a single reclose setting (Z). |

Also, when reclosing relay 10 is configured for GE ACR11B operation, the output description is the same as when it is configured for GE ACR11A operation, with the exception of the outputs listed in Table 7.

TABLE 7

DIFFERENCES IN OUTPUT WHEN CONFIGURED FOR GE ACR11B OPERATION

| Output | Terminals | Description |
|---|---|---|
| C1 | 12, 17 | This output will close momentarily when voltage is sensed at input V4 and the relay is in a reset condition. (Z2 + E6) |
| C4 | 18, 19 | This output is closed any time that the unit is not in reset. (E5) |
| C5 | 17, 19 | This Reclose output closes for three seconds after a reclose timer expires. (AB) |
| C6 | 14, 17 | This Anti-Pump output closes for the duration of a reclose timing except if output C5 closes. If C5 closes, output C6 will close only if voltage is sensed at contact sensing input V2. (BC + Z1) |
| C7 | 8, 20 | This output is closed when the relay is in a lockout condition. (HI) |
| C10 | 1, 2 | This output is closed during a reset condition and open when a reclose timing begins. (E4) |

Figure 7:
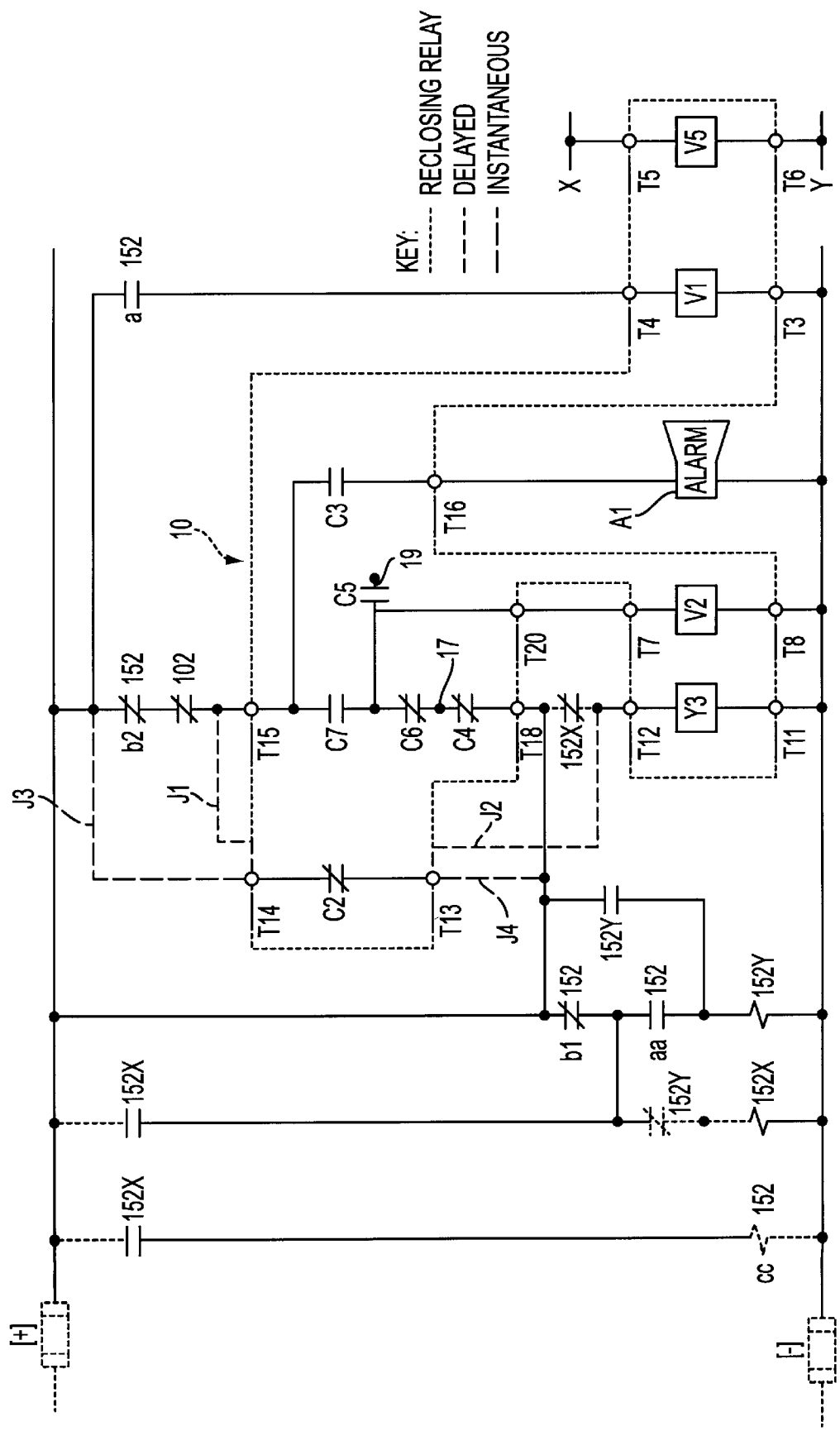
FIG. 7 is a simplified schematic diagram of a typical configuration of the reclosing relay of FIG. 1 in circuit in an application requiring terminal connections of a GE ACR11A reclosing relay.

A typical in-circuit configuration of reclosing relay 10 connected in a GE ACR11A application is shown in schematic form in FIG. 7. The circuitry of the reclosing relay is within the light, closely spaced dashed lines. External components are shown using standard IEEE designations. Jumpers J1 and J2 are added for delayed operation, while jumpers J3 and J4 are added for instantaneous operation. FIG. 8A and FIG. 8B together are a schematic for a typical in-circuit configuration of reclosing relay 10 connected in a GE ACR11B (or GE ACR11C–F) application. Jumper J5 in FIG. 8A may be provided for instantaneous operation. In both FIG. 7 and FIG. 8A, the terminal connection for an optional alarm A1 is shown. In FIG. 7, FIG. 8A, and FIG. 8B, the illustrated contacts indicate the state of the contact (normally open or closed) during the reset condition.

Since the relay is microprocessor-based, it must be powered by a supply voltage to operate. These were chosen because in most applications, voltage is present at these terminals when operation is desired from the relay. For applications where power is removed from terminals 5 and 6 but will be restored prior to future relay operation, the relay has a memory that stores the stores the status when power is removed. When power is restored, the relay will return to the same condition it was in at power down and will continue from that point.

Operating power for reclosing relay 10 is preferably provided by an isolated internal switching power supply that can operate over a range of 120 to 240 Vac or 125 to 250 Vdc without changes in connections or jumpers, and without polarity sensitivity. The supply is not disrupted by variations in the supply voltage or frequency over the power supply operating range. In a preferred embodiment, the switching power supply generates an operating voltage of 24 Vdc.

Operating power must be applied to terminals 5 and 6 for a reset to occur. The external communications port 22 is preferably a standard RS-232 serial communication port, which may be provided via a DB-9 female connector on the front panel of the unit. The serial port provides means to configure and read relay settings. Typically, commands may be provided for reading the state of all of the relay settings or a specific relay setting, for setting the reclose and reset timer settings, for setting the lockout timer, for setting RS contact times (the apply and the remove time, i.e., the time from the start of the reclose cycle until the RS contact is applied, and the time from the start of the reclose cycle until the RS contact is removed, for setting the lockout/relay fail selection (e.g., relay fail, or relay fail and lockout), and for reading information about hardware/software configuration. Other features, such as on-line help and data access control, may be provided.

The contact sensing inputs V1–V5 preferably employ optoisolators to provide isolation from external power sources. The contact sensing inputs are preferably rated for 48 to 250 Vdc and 120 to 240 Vac at 45 to 65 Hz. Reset switch 26 is preferably a momentary contact switch to clear the LED indications and to restore the relay to a reset condition. The reset switch performs the same function as the manual clutch release on the GE ACR11 series relays.

Significantly, the physical configuration of the reclosing relay, in accordance with the invention, provides "plug and play" convenience. It can be installed in an existing General Electric Co. type S2 case with no wiring changes required. It can also be fitted into new cases for new installations, if desired.

Figure 9A:
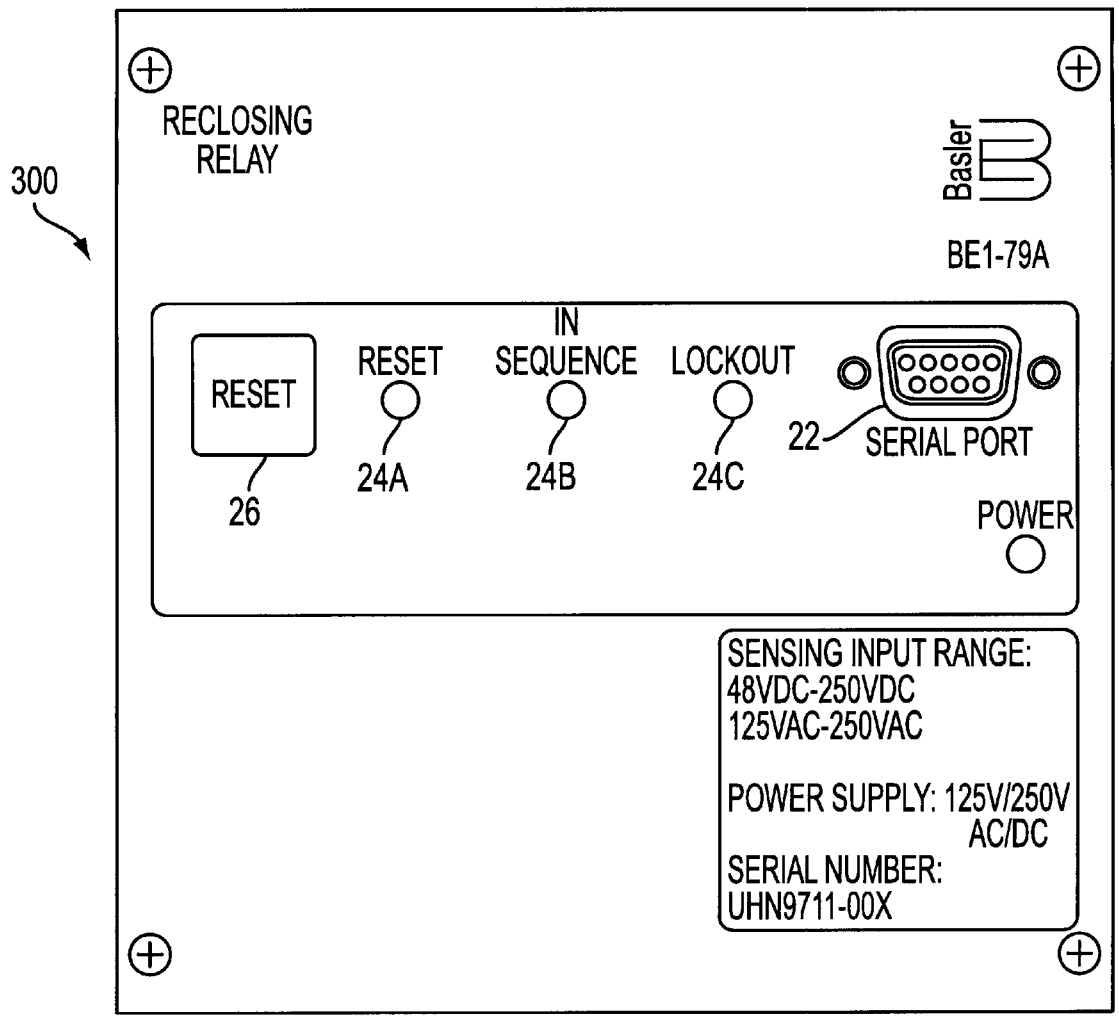
FIG. 9A is a view of a front panel suitable for a the reclosing relay shown in FIG. 1.
Figure 9B:
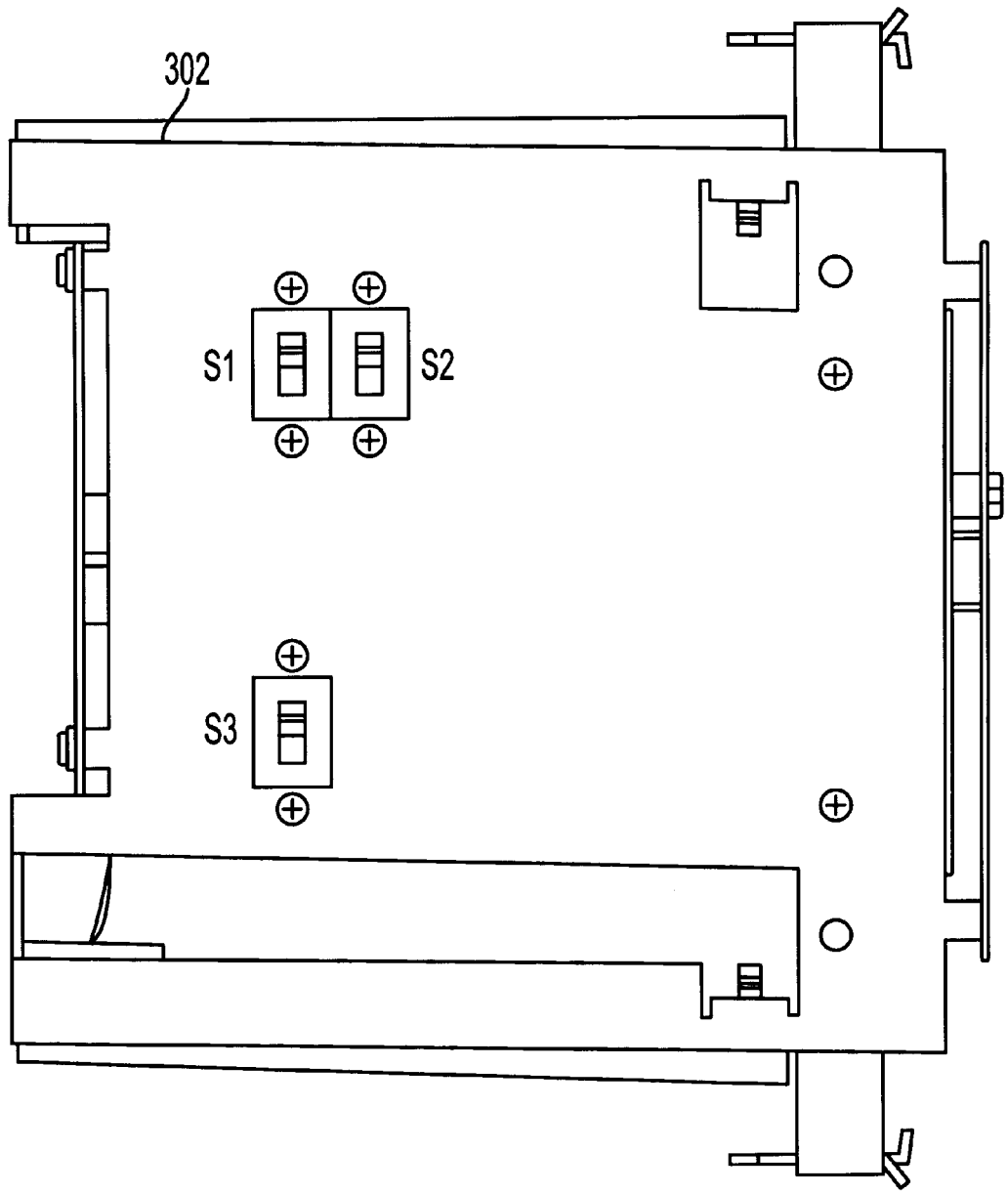
FIG. 9B is a view of the left side of a relay for the reclosing relay shown in FIG. 1.
Figure 9C:
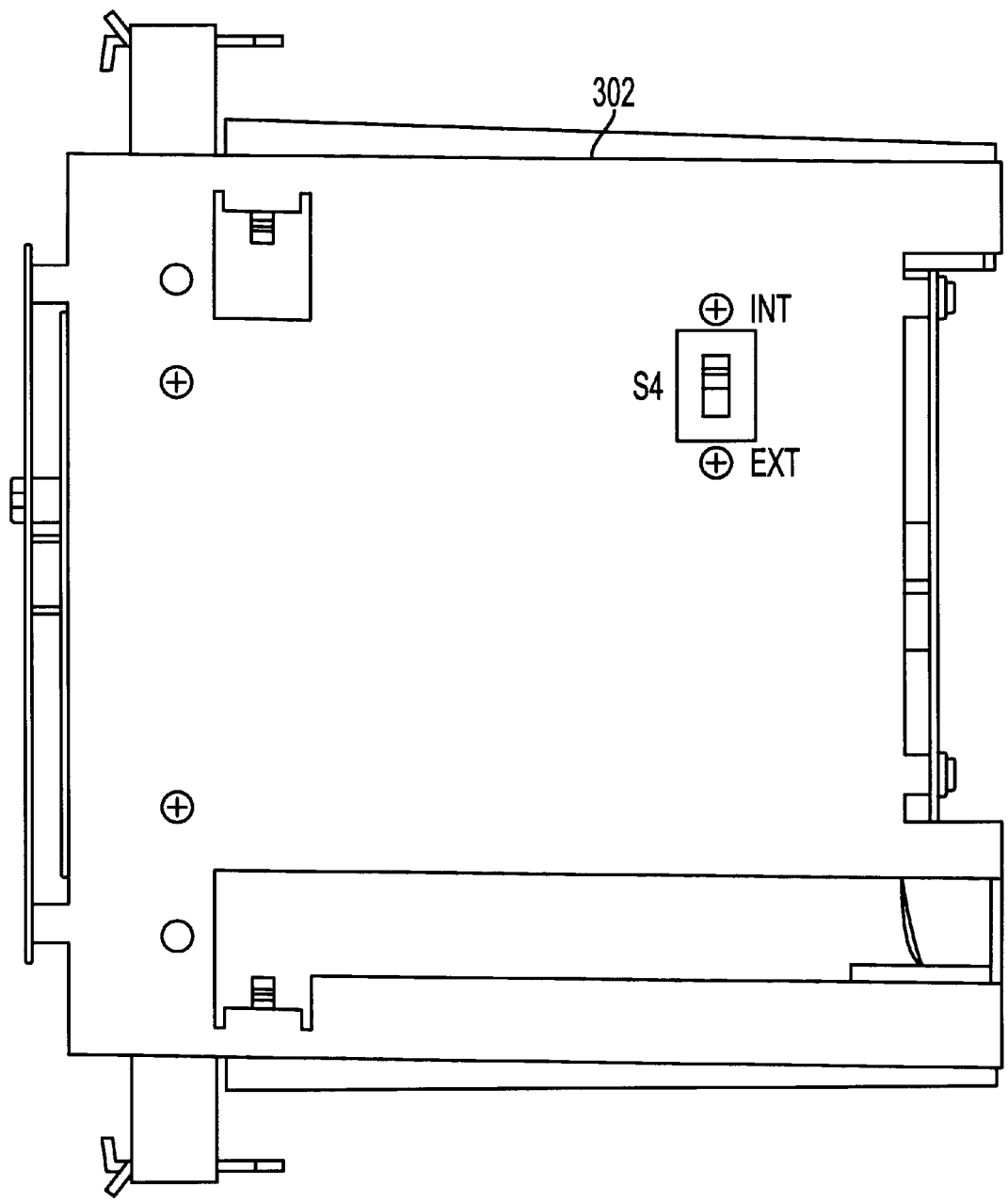
FIG. 9C is a view of the right side of the relay shown in FIG. 9B.
Figure 9D:
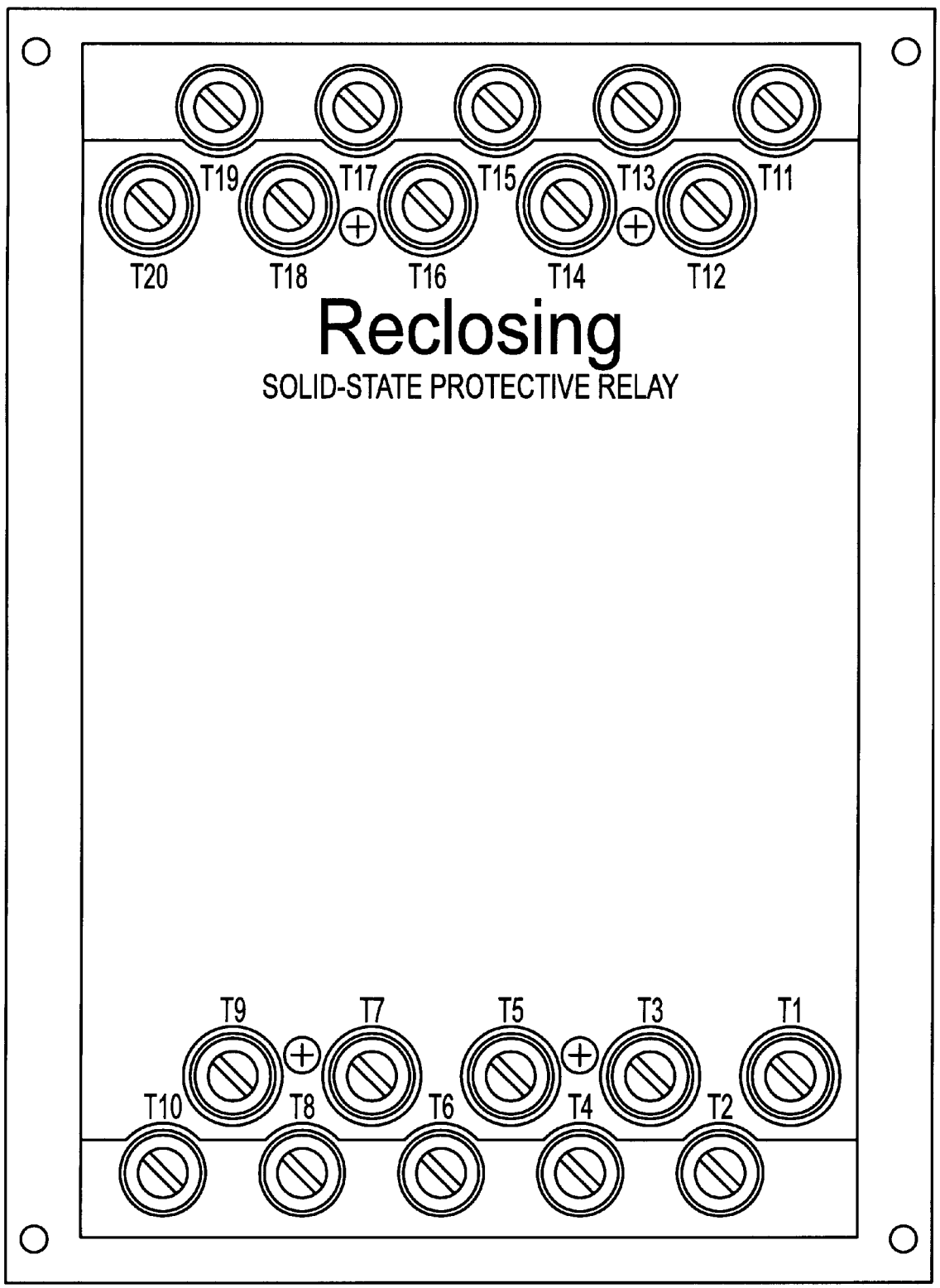
FIG. 9D is a view of the rear of an S1-type case suitable for housing the reclosing relay of FIG. 1 in a new (not retrofitted) application.

A front panel 300 suitable for the reclosing relay is shown in FIG. 9A. The reset button 26, communications port 22, and LED indicators 24 (shown here as three separate indicators 24A, 24B, and 24C) as shown, and are accessible from the front panel. Style configuration switches are on the left side of the relay chassis 302, as shown in FIG. 9B. In FIG. 9B, switch S2 controls both sections S2A and S2B in FIG. 2 and FIG. 3, while switch S3 controls both sections S3A and S3B in FIG. 2 and FIG. 3. The right side of the relay chassis 302 shown in FIG. 9C shows a suitable location for switch S4, which selects either internal or external jumpering for an instantaneous first reclosure. FIG. 9D shows a rear view of an S1 case, with terminal connections T1-T10 and T11-T20 indicated. These correspond to TB1-1 through TB1-10 and TB2-11 through TB2-20, respectively. The S1 style case is provided for new applications of the inventive reclosing relay. It will be understood that the arrangement of electrical terminals within the chassis 302 of the reclosing relay is also physically compatible with the S2 case to allow "plug and play" replacement of the reclosing relay 10 in existing installations.

Replacing an existing GE ACR11 style reclosing relay with reclosing relay 10 involves the following steps: The previously installed reclosing relay is removed from an existing S2 case having a set of external electrical terminals mechanically configured for electrical contact with a second set of electrical terminals on the previously installed reclosing relay prior to its removal. A reconfigurable reclosing relay 10 is provided having a third set of terminals adapted to provide contact with the first set of electrical terminals when the reconfigurable relay is installed in the existing S2 case. If necessary, switches or other reconfigurable electrical components on the reconfigurable relay are set into the proper positions so that the inputs and outputs of the replacement relay are compatible with those of the relay that was removed from service. The reconfigurable relay is installed in the existing case, power is applied, and instructions are provided through the communications port to instruct the reconfigurable relay to emulate the operation of the previously installed relay.

The order of the steps may be varied. For example, power could be applied before the reconfigurable relay is installed in the case, and instructions could be applied through the communications port before the replacement relay is installed in the existing case. In this event, the nonvolatile configuration memory 20 could be used to retain the configuration when power is removed before the replacement relay is installed. By performing the configuration steps in this manner, the replacement relay can be configured before it is actually installed, and be ready for quick field installation.

It will be observed that the replacement relay (which is also suitable for new installations) can be manufactured at low cost, because expensive motors and cams can be replaced with less expensive, more reliable solid state devices and relays. Because the microcomputer control circuitry is programmable, and because the terminals of the relay can be switched to emulate a number of different prior art relays, many models of existing relays can be replaced with a single model replacement relay. Wide range sensing inputs can be provided by having a current limited sensing circuit that allows sensitivity to pickup at the low range without drawing excessive current at the high end of the range, simplifying ordering and stocking of relays. Cost is further reduced by the use of a port to program the microcomputer, rather than front panel switches.

Because all contacts are operated by the microcomputer, no input is tied to any output. The microcomputer determines what each input is depending upon the configuration, allowing increased configuration flexibility. External switches are provided to increase the level of configuration flexibility.

Added and improved functionality is provided by increasing the range for the reclose and reset times from 0 to 180 seconds for the GE ACR11A–ACR11F relays to 0 to 300 seconds (at least) with 0.1 second setting intervals, or such other intervals as may be allowed and programmed by the microcomputer. Also, the lockout time may be set over a wider range than previously available. The lockout contact may also be used as a relay fail contact to indicate whether there is a problem with the relay. In the prior art GE relays, the auxiliary RS contact could be set to occur at any time, but only with a fixed duration.

Figure 10:
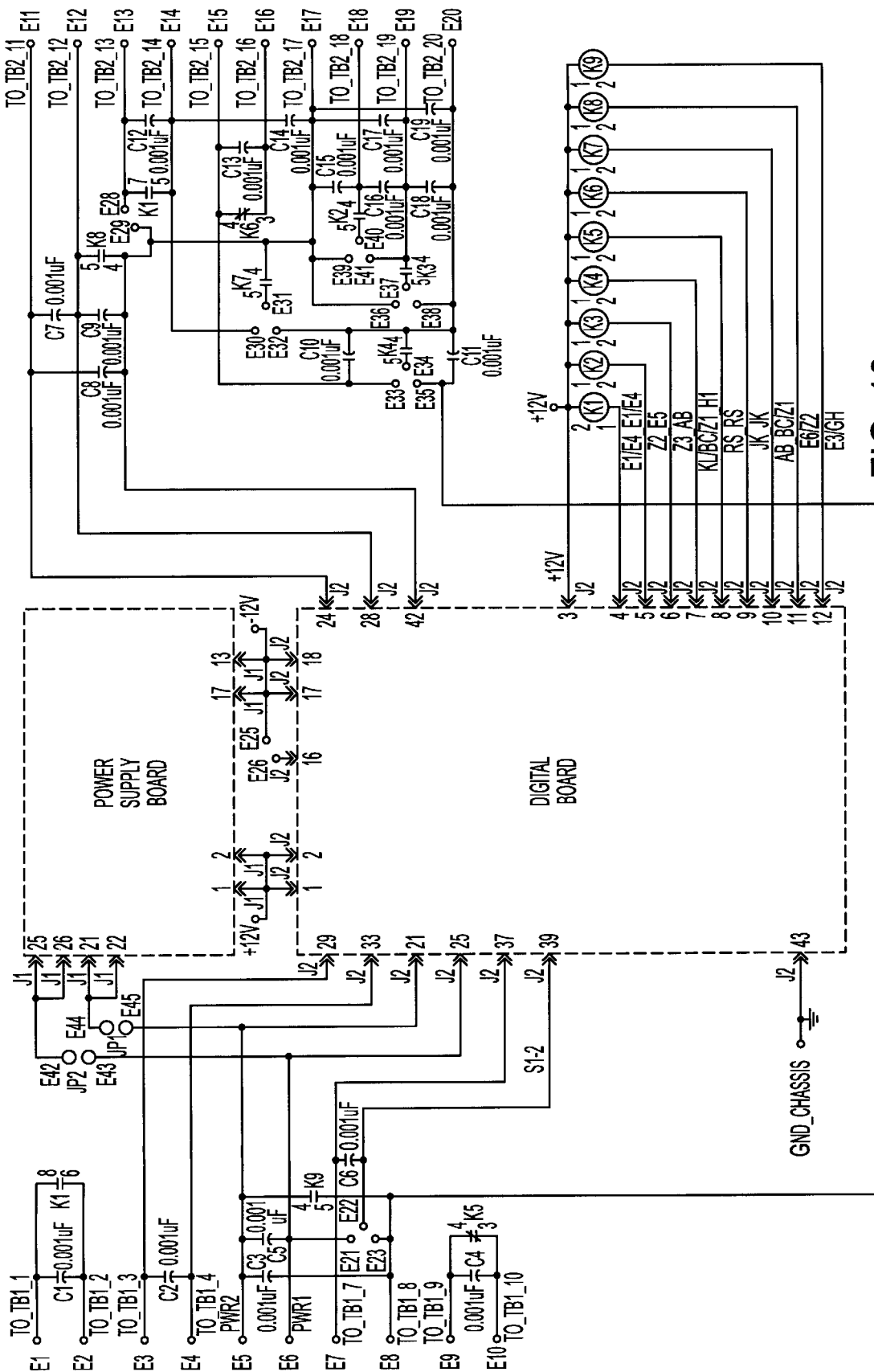
FIG. 10 is a detailed schematic diagram of a motherboard of an embodiment of a reclosing relay in accordance with the invention.
Figure 11A:
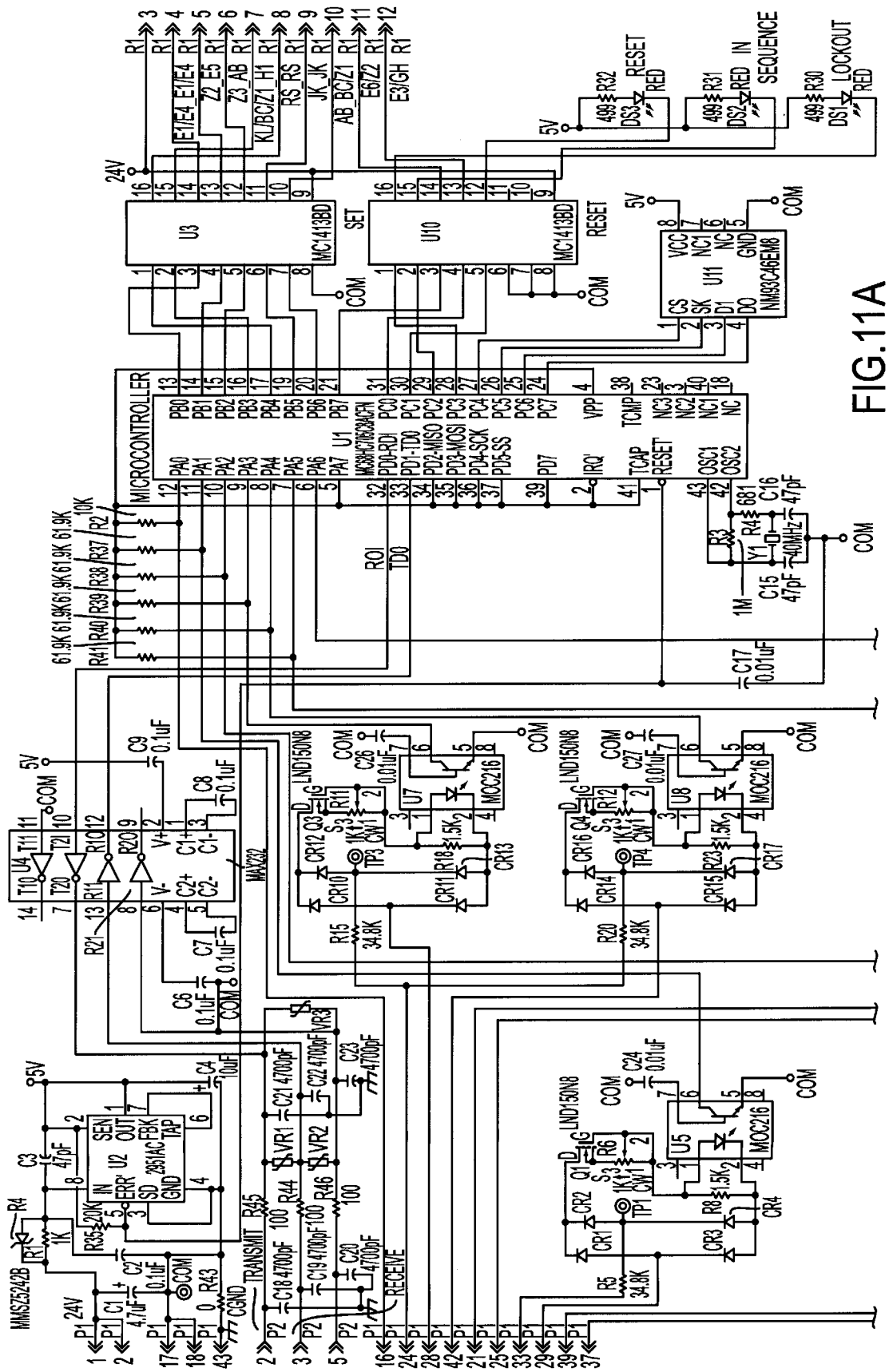
FIG. 11 is a detailed schematic diagram of the digital board depicted in FIG. 10.
Figure 11B:
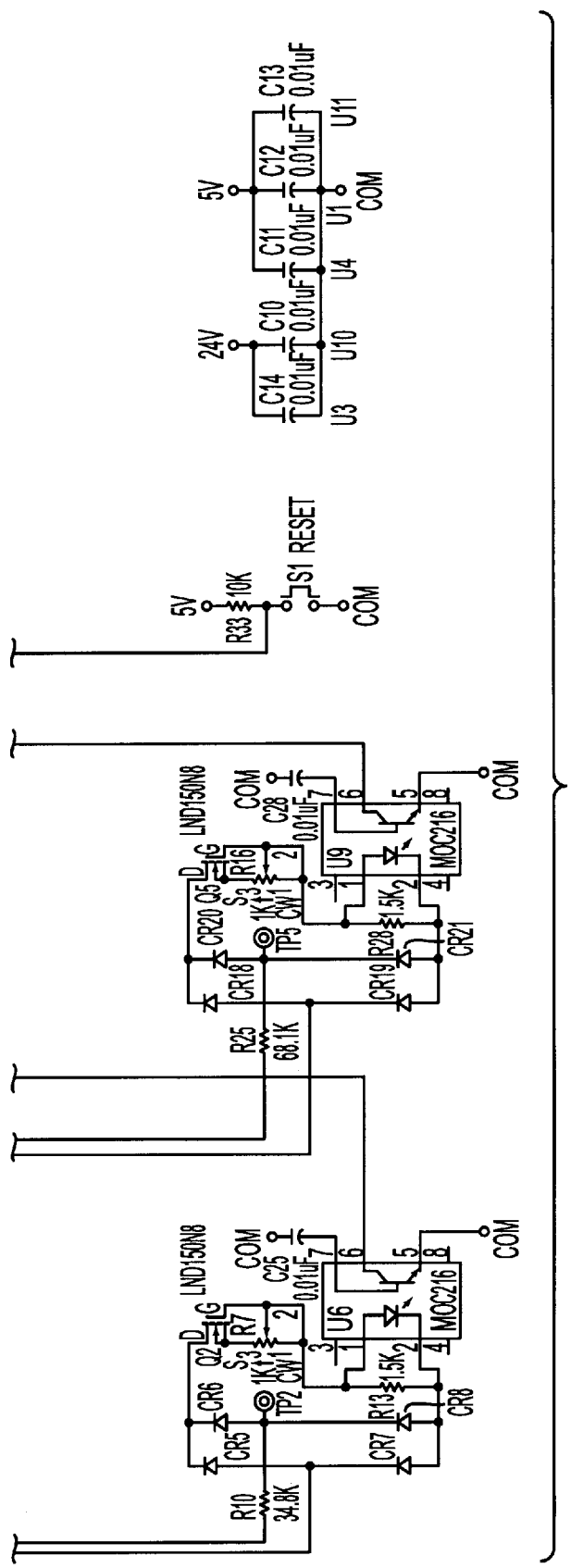
Figure 12A:
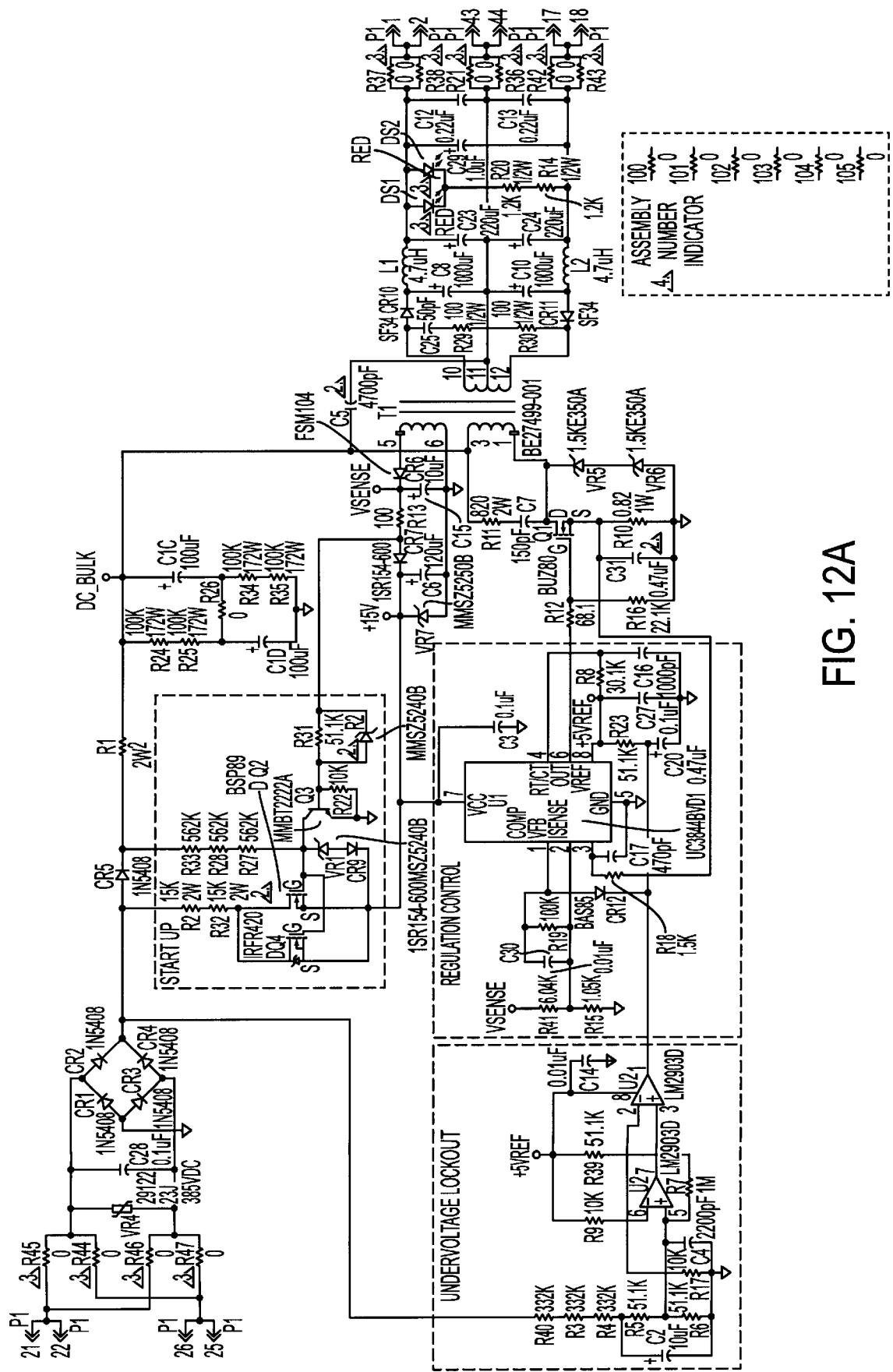
FIG. 12 is a detailed schematic diagram of the power supply board depicted in FIG. 10.

FIG. 10 is a detailed electrical schematic diagram of an embodiment of a motherboard suitable for an embodiment of a reclosing relay in accordance with the invention. FIG. 11 is a detailed electrical schematic diagram of the digital board depicted in FIG. 10. FIG. 12 is a detailed schematic diagram of the power supply board depicted in FIG. 10. Also attached hereto as an Appendix B is an instruction manual detailing the specifications, functional description, installation information, and testing procedures for this embodiment of the reclosing relay. A program listing for the code executed by the microprocessor shown in FIG. 11 is also attached as an microfiche Appendix A. The material attached in the appendices of this specification is copyright Basler Electric Co., Highland, Ill. All rights are reserved, except that publication solely for the purpose of disseminating this patent is permitted.

Although the present invention has been described in terms of a preferred embodiments, it will be appreciated that various modifications and alterations may be made by those skilled in the art without departing from the spirit and scope of the invention. Therefore, the scope of the invention should be determined with reference to the claims below and their full legal range of equivalents.

What is claimed is:

1. An electronic reclosing relay for power distribution systems, said reclosing relay being physically installable in a relay case adapted to receive either one of a motor-driven relay of a first type and a motor-driven relay of a second type, said reclosing relay being selectively configurable for emulating a functional operation of either one of the motor-driven relay of the first type and the motor-driven relay of the second type.

2. The reclosing relay of claim 1 wherein the motor-driven relay of the first type is a GE ACR11A relay, the motor-driven relay of the second type is a GE ACR11B relay, and the reclosing relay is selectively configurable for emulating the functional operation of either one of the GE ACR11A and the GE ACR11B relays.

3. The reclosing relay of claim 2 wherein said reclosing relay comprises electrical contacts for contacting terminals on said relay case when said reclosing relay is inserted into said relay case.

4. The reclosing relay of claim 3 further comprising a plurality of reconfigurable switches for interconnecting said electrical contacts in a plurality of different arrangements.

5. The reclosing relay of claim 4 and further comprising wide-range sensors configured to sense voltages at some of the plurality of electrical contacts for emulating a functional operation of said selected motor-driven relay type.

6. The reclosing relay of claim 5 and further comprising a controller responsive to said wide-range sensors for emulating a functional operation of said selected motor-driven relay type.

7. The reconfigurable reclosing relay of claim 6 wherein said controller is electronically programmable to provide a range of reclose and reset times.

8. The reconfigurable reclosing relay of claim 7 wherein said controller is electronically programmable to provide a selectable number of reclose cycles.

9. The reconfigurable reclosing relay of claim 8 wherein said controller includes nonvolatile memory configured to store a state of the relay when power is removed from the relay.

10. A reclosing relay for use in a power distribution system comprising:
 a chassis;
 a plurality of electrical contacts including electrical contacts at which applied voltages are sensed and electrical contacts for switching electrical circuitry external to the chassis;
 a controller responsive to the applied voltages for operably controlling electrical circuitry connected externally to said chassis via the electrical contacts; and
 switches adapted to selectively reconfigure operable connection of the electrical contacts to the controller,
 the electrical contacts, controller, and switches being housed by the chassis.

11. The device of claim 10 configured for replacement installation in an existing case of a reclosing relay to be replaced, and in which the electrical contacts and chassis are adapted for direct replacement into the existing case, and the switches are configured to provide emulation of one of a plurality of different types of reclosing relays.

12. The device of claim 11 wherein the plurality of different types of reclosing relays includes at least GE ACR11A and GE ACR11B types.

13. The device of claim 11 and further comprising wide-range sensing elements configured for sensing the applied voltages, the controller being responsive to the wide-range sensing elements for operably controlling the external electrical circuitry via the electrical contacts.

14. The device of claim 13 wherein the controller operates a plurality of relays having relay contacts electrically in circuit with the electrical contacts to operably control the external electrical circuitry.

15. The device of claim 14 and further comprising a communications port, the controller being responsive to data received at the communications port for setting delay times between sensing of the electrical voltages and control of the external electrical circuitry.

16. The device of claim 15 wherein the controller is responsive to data received at the communications port for providing a selectable number of reclosure attempts before a lockout state is entered.

17. A reclosing relay comprising:

a plurality of input sensors configured to sense signals at some of a plurality of electrical contacts;

a plurality of output relays operably coupled to some of the plurality of electrical contacts, the input sensors and output relays thereby forming a group of contact-connected elements;

a programming input port;

a microcomputer including a stored program for selectively emulating one of a plurality of configurations for controlling the plurality of output relays, the microcomputer being responsive to a first subset of the plurality of input sensors for operably controlling at least a subset of the plurality of output relays in accordance with data input to the programming input port; and a chassis housing the plurality of electrical contacts, the plurality of input sensors, the plurality of output relays and the microcomputer.

18. The device of claim 17 wherein said device is adapted for insertion into a case having a plurality of electrical terminals configured for operably contacting the plurality of electrical terminals when the reclosing relay is inserted into the case.

19. The device of claim 18 and further comprising at least one switch in circuit with the terminal-connected elements configured to selectively switch electrical connections between at least one of the terminal-connected elements and at least one of the plurality of electrical terminals.

20. The device of claim 19 wherein the microcomputer is adapted to provide a selectable reclosing delay in accordance with data input to the programming input port.

21. A method for replacement of a reclosing relay in a distribution system, the method comprising the steps of:

removing a previously installed reclosing relay from a case having a first set of electrical contacts adapted to operably mate with a set of electrical terminals on the previously installed reclosing relay prior to its removal;

providing a replacement reconfigurable reclosing relay having a second set of electrical contacts adapted to operably mate with the set of electrical terminals when the replacement reconfigurable reclosing relay is installed in the case;

installing the replacement reconfigurable reclosing relay in the case; and configuring the replacement reconfigurable reclosing relay to emulate the operation of the previously installed relay.

22. The method of claim 21 wherein the configuring of the replacement reconfigurable reclosing relay comprises setting switches to emulate an electrical terminal configuration.

23. The method of claim 22 wherein the replacement reconfigurable reclosing relay comprises a microcomputer and the configuration of the reconfigurable relay comprises supplying data to the microcomputer via a communications port.

24. A reclosing relay for power distribution systems, said reclosing relay being physically installable in a relay case adapted to receive either one of a motor-driven relay of a first type and a motor-driven relay of a second type, said motor-driven relay of the first type requiring a first wiring configuration for said relay case and said motor-driven relay of the second type requiring a second wiring configuration for said relay case, said reclosing relay being selectively configurable for emulating, upon installation in said relay case, a functional operation of the specific motor-driven relay for which said case is wired without requiring rewiring of said relay case.

25. The reclosing relay of claim 24, wherein the motor-driven relay of the first type is a GE ACR11A relay, and the motor-driven relay of the second type is a GE ACR11B relay.

* * * * *